(12) United States Patent
Shigehiro

(10) Patent No.: US 10,261,442 B2
(45) Date of Patent: Apr. 16, 2019

(54) DEVELOPING APPARATUS AND IMAGE FORMING APPARATUS

(71) Applicant: CANON KABUSHIKI KAISHA, Tokyo (JP)

(72) Inventor: Koji Shigehiro, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/916,537

(22) Filed: Mar. 9, 2018

(65) Prior Publication Data
US 2018/0284650 A1    Oct. 4, 2018

(30) Foreign Application Priority Data
Mar. 30, 2017  (JP) ................... 2017-068773

(51) Int. Cl.
| G03G 15/08 | (2006.01) |
| G03G 15/00 | (2006.01) |
| G03G 15/20 | (2006.01) |
| G03G 15/01 | (2006.01) |

(52) U.S. Cl.
CPC ..... *G03G 15/0887* (2013.01); *G03G 15/0189* (2013.01); *G03G 15/0893* (2013.01); *G03G 15/2003* (2013.01); *G03G 15/5054* (2013.01); *H04N 2201/0094* (2013.01)

(58) Field of Classification Search
CPC .......... G03G 15/0887; G03G 15/0891; G03G 15/0893; G03G 2215/0822; G03G 2215/0838; G03G 15/0189; G03G 15/2003; G03G 15/5054; H04N 2201/0094
See application file for complete search history.

(56) References Cited

U.S. PATENT DOCUMENTS

| 6,324,369 B1 * | 11/2001 | Yamaguchi ........ G03G 15/0822 399/119 |
| 9,176,430 B2 | 11/2015 | Yoshizawa et al. |
| 9,213,259 B2 | 12/2015 | Shigehiro |
| 2006/0204283 A1 * | 9/2006 | Yasuda .............. G03G 15/0893 399/254 |
| 2014/0112687 A1 * | 4/2014 | Ohmura ............. G03G 15/0893 399/254 |

(Continued)

FOREIGN PATENT DOCUMENTS

JP    2014-178347 A    9/2014

*Primary Examiner* — Sophia S Chen
(74) *Attorney, Agent, or Firm* — Venable LLP

(57) ABSTRACT

A developing apparatus includes a developer bearing member to bear developer containing toner and carrier to develop an electrostatic latent image formed on an image bearing member, a first chamber to supply developer to the developer bearing member, a second chamber to communicate with the first chamber to circulate developer, and a partition wall to separate the first and second chambers. An opening portion, through which an airflow from the second chamber toward the first chamber passes, is provided to the partition wall, and a length of the opening portion is equal to or longer than a length of a plurality of pitches of blades of a conveyance screw provided in the second chamber. A length, in the vertical direction, of the opening portion at a first position is longer than a length, in the vertical direction, of the opening portion at a second position.

5 Claims, 15 Drawing Sheets

(56) References Cited

U.S. PATENT DOCUMENTS

2016/0116863 A1* 4/2016 Kubo ................. G03G 15/0891
　　　　　　　　　　　　　　　　　　　　　399/254
2017/0115604 A1* 4/2017 Hosokawa ......... G03G 15/0891
2017/0146927 A1　　5/2017 Shigehiro
2017/0343928 A1* 11/2017 Shirayanagi ....... G03G 15/0893

* cited by examiner

DEVELOPING APPARATUS AND IMAGE FORMING APPARATUS

BACKGROUND OF THE INVENTION

Field of the Invention

The present invention relates to a developing apparatus having a developer bearing member that bears developer and rotates, and to an image forming apparatus, such as a copying machine, a printer, a facsimile, or a multifunction machine equipped with these functions, having the developing apparatus.

Description of the Related Art

Image forming apparatuses adopting an electrophotographic system or an electrostatic recording system include a developing apparatus that develops an electrostatic latent image formed on a photosensitive drum serving as an image bearing member using toner and other developer. The developing apparatus includes a developing sleeve serving as a developer bearing member that bears developer and rotates, and the developer borne on the developing sleeve is supplied to the photosensitive drum.

Some developing apparatuses use a two-component developer that includes nonmagnetic toner particles, i.e., toner, and magnetic carrier particles, i.e., carrier, as developer. Especially, in color image forming apparatuses, two-component developer is generally used due to reasons such as good color quality, since there is no need to mix magnetic substance to toner. Recently, longer life has been realized in the developing apparatuses that use two-component developer, and the developing apparatus is only replaced two to three times during the life of the image forming apparatus body. Along therewith, the life of developer contained in the developing apparatus is also elongated, and a state where developer in a certain deteriorated state is used continuously is continued for a long time.

Therefore, charge imparting property of carrier to replenished toner is also deteriorated compared to the initial state, and a state where distribution of amount of charge of developer is relatively low continues for a long time. In this state, the toner having a low amount of charge has deteriorated electrostatic adhesion force with carrier particles and may easily be separated, such that probability of toner scattering in air caused by agitation or conveyance action of toner in the developing apparatus, or by formation of magnetic bristles, is increased. Thus, toner may be scattered to the exterior of the developing apparatus and adhere to the optical path of a laser scanner and interfere with formation of latent image, causing image defects such as generation of white lines on the image.

Hitherto, for example, as disclosed in Japanese Patent Laid-Open No. 2014-178347, a technique of suppressing scattering of toner within an apparatus has been developed. In this Japanese Patent Laid-Open No. 2014-178347, a configuration is disclosed in which a filter is used to reduce internal pressure of the developing apparatus, thereby preventing toner from scattering through a gap formed between a developer container and a developing sleeve, for example.

However, according to the configuration disclosed in Japanese Patent Laid-Open No. 2014-178347, a filter is used to reduce toner scattering, such that the apparatus cannot correspond to short-term pressure fluctuation due to pressure loss generated at the filter, and the pressure is stabilized slowly. If a rough filter that generates small pressure loss is used as the filter that corresponds to a short-term pressure fluctuation, scattered tonner cannot be collected sufficiently, and the scattered toner may leak to the exterior of the developing apparatus.

One of the problems of toner scattering is that it is sometimes caused by replenishment of toner, in addition to the normal developer agitation. The scattering of replenished toner is not a phenomenon that occurs constantly, and it occurs only at a timing of replenishment operation, but the amount of scattering of toner is great, such that there is a need to perform airflow control when this phenomenon occurs. Specifically, replenished toner discharged from a container storing replenished developer reaches a replenishing portion of the developing apparatus. During this process, replenished toner scatters when falling in the air, and shock generated when the toner falls to a developer surface of developer in the developing apparatus causes toner to fly up and scatter. Further, toner may scatter in the air when toner or developer containing a high ratio of toner is agitated by an agitating screw provided in the developing apparatus.

However, according to the configuration disclosed in Japanese Patent Laid-Open No. 2014-178347, toner scattering is reduced by stabilizing pressure using a filter, such that if a large amount of toner scattering occurs only when toner is replenished, it is not possible to collect scattered toner sufficiently, and the scattered toner may leak to the exterior of the developing apparatus.

SUMMARY OF THE INVENTION

According to one aspect of the present invention, a developing apparatus includes a developer bearing member configured to bear developer and rotate, a first chamber configured to store developer, a second chamber configured to supply developer to the developer bearing member, a first communicating portion and a second communicating portion configured to communicate developer between the first and second chambers, a wall portion disposed between the first and second communicating portions in a rotational axis direction of the developer bearing member, and configured to separate the first and second chambers, a first conveyance member provided in the first chamber, and configured to convey developer in a first direction from the first communicating portion toward the second communicating portion, a second conveyance member provided in the second chamber, and configured to convey developer in a second direction, that is opposite to the first direction, from the second communicating portion toward the first communicating portion, a replenishing portion configured to replenish developer to the first chamber, and an air vent portion provided on the wall portion at a position higher than a height of the first conveyance member and a height of the second conveyance member in a vertical direction, and configured to vent air between the first and second chambers. And according to one aspect of the present invention, a developing apparatus includes a developer bearing member configured to bear developer and rotate, a first chamber configured to store developer, a second chamber configured to supply developer to the developer bearing member, a first communicating portion and a second communicating portion configured to communicate developer between the first and second chambers, a wall portion disposed between the first and second communicating portions in a rotational axis direction of the developer bearing member, and configured to separate the first and second chambers, a first conveyance member provided in the first chamber, and configured to convey developer in a first direction from the first communicating portion toward the second communicating portion, a second conveyance member provided in the second chamber, and configured to convey developer in a second direction, that is opposite to the first direction, from the second communicating portion toward the first communicating portion, and a replenishing portion configured to replenish developer to the first chamber. The opening area above the first and second conveyance members in the second communicating portion is greater than an opening area above the first and second conveyance members in the first communicating portion.

Further features of the present invention will become apparent from the following description of exemplary embodiments with reference to the attached drawings.

DESCRIPTION OF THE EMBODIMENTS

First Embodiment

A first embodiment will be described with reference to FIGS. 1 through 7 and 15A through 15D. At first, a schematic configuration of an image forming apparatus according to the present embodiment will be described with reference to FIGS. 1 and 2.

Image Forming Apparatus

An image forming apparatus 100 according to the present embodiment is a tandem-type full-color printer adopting an electrophotographic system including four image forming units PY, PM, PC and PK each having a photosensitive drum 1 serving as an image bearing member. The image forming apparatus 100 forms a toner image on a recording material based on image signals sent from a document reading apparatus (not shown) connected to an apparatus body 100A or a host device such as a personal computer connected in a communicatable manner to the apparatus body 100A. Paper, plastic film, cloth and other sheet material can be used as the recording material. The image forming units PY, PM, PC and PK form toner images of yellow, magenta, cyan and black, respectively.

The four image forming units PY, PM, PC and PK of the image forming apparatus 100 have similar configurations, expect for the different developer colors. Therefore, only the image forming unit PY will be described, and other image forming units will not be described.

Figure 2:
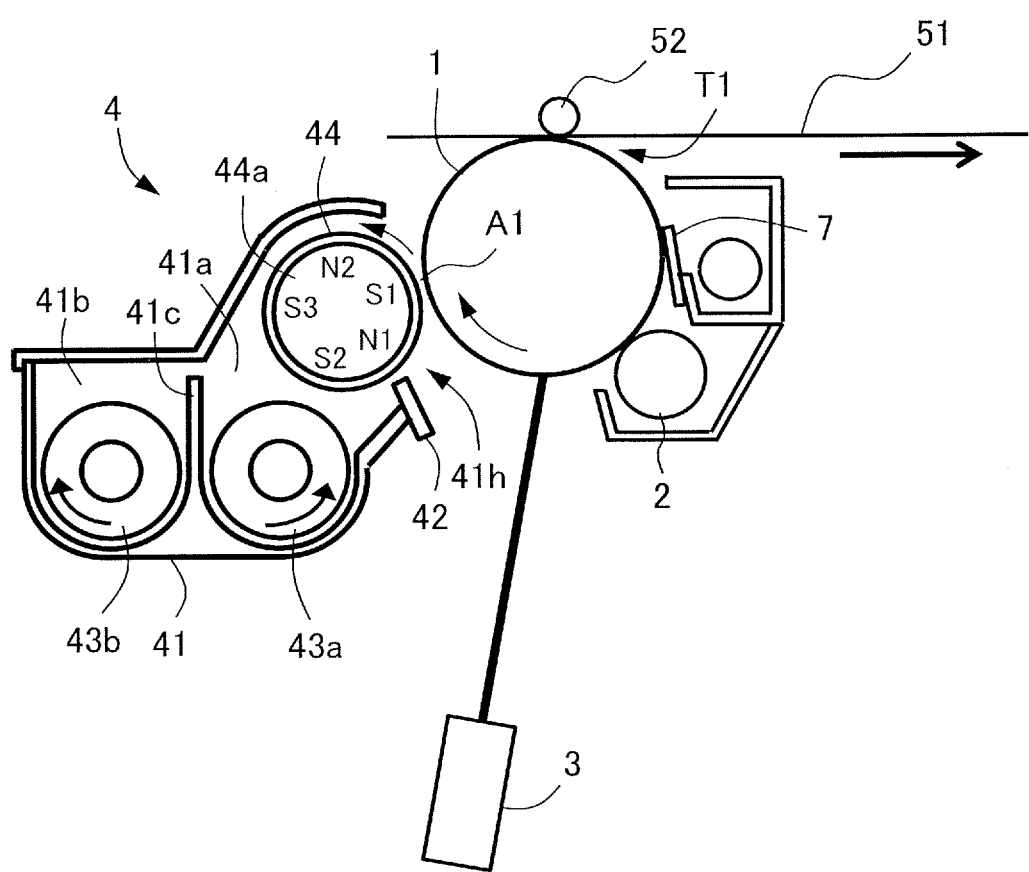
FIG. 2 is a schematic cross-sectional view of an image forming unit according to the first embodiment.

As illustrated in FIG. 2, the image forming unit PY includes a cylindrical photoconductor, that is, the photosensitive drum 1, serving as an image bearing member. The photosensitive drum 1 is driven to rotate in an arrow direction in the drawing. A charging roller 2 serving as a charging unit, a developing apparatus 4, a primary transfer roller 52 serving as a transfer member, and a cleaning device 7 serving as a cleaning unit are arranged in a circumference of the photosensitive drum 1. An exposing unit, which in the present embodiment is a laser scanner 3, serving as an exposing portion is arranged at a lower portion in the drawing of the photosensitive drum 1. The photosensitive drum 1 bears an electrostatic latent image developed by the developing apparatus 4.

Figure 1:
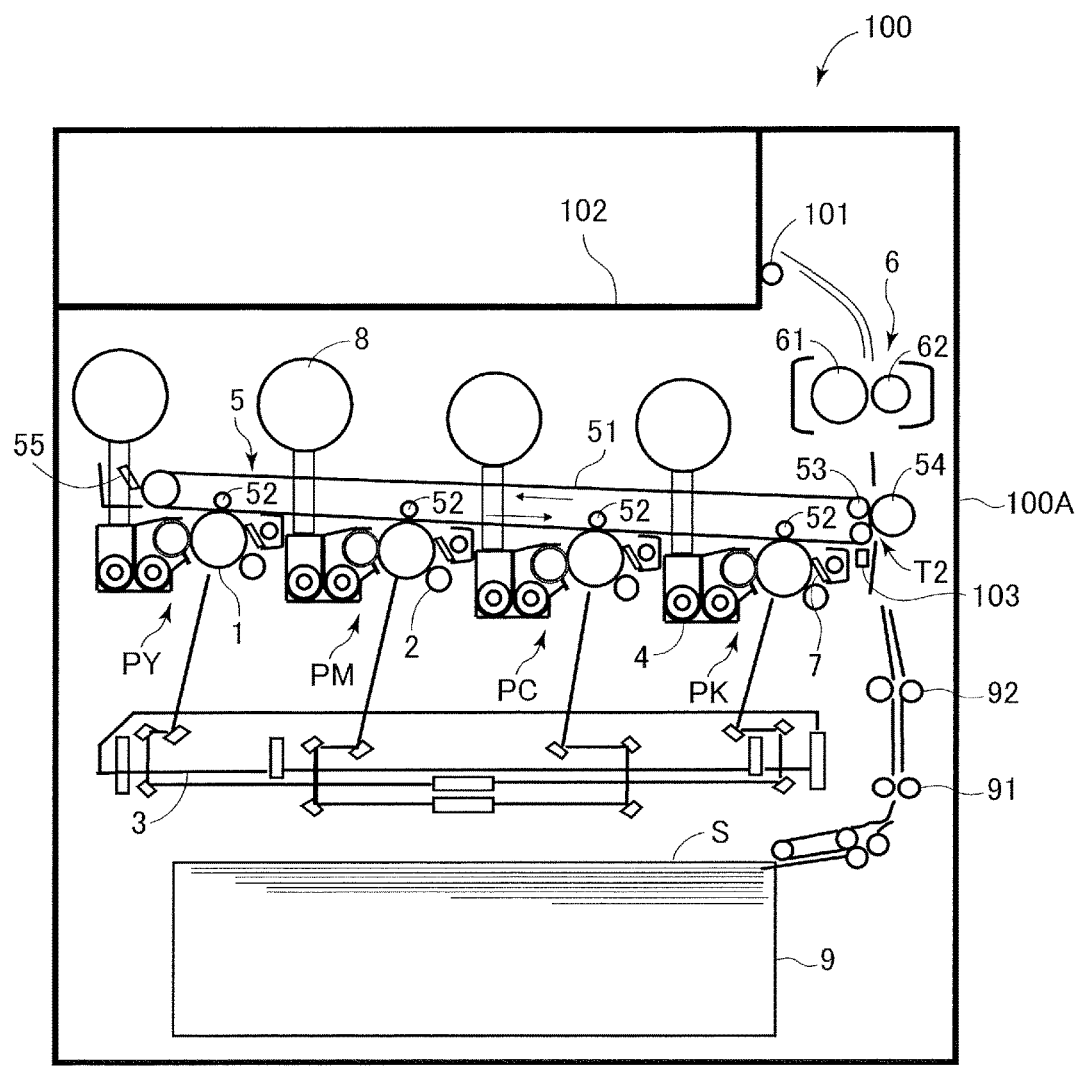
FIG. 1 is a schematic cross-sectional view of an image forming apparatus according to a first embodiment.

As illustrated in FIG. 1, a transfer device 5 is arranged above the respective image forming units. The transfer device 5 is configured such that an endless intermediate transfer belt 51 serving as an intermediate transfer body is stretched across a plurality of rollers and moved in circulating motion, i.e., rotated, in the direction of the arrow. The intermediate transfer belt 51 bears and carries a toner image primarily transferred to the intermediate transfer belt 51 as described later. Among the rollers across which the intermediate transfer belt 51 is stretched, a secondary transfer outer roller 54 serving as a secondary transfer member is arranged at a position opposed to a secondary transfer inner roller 53 with the intermediate transfer belt 51 intervened, constituting a secondary transfer portion T2 at which the toner image on the intermediate transfer belt 51 is transferred to the recording material. A fixing unit 6 is arranged downstream of the secondary transfer portion T2 in a conveyance direction of the recording material.

A cassette 9 accommodating recording materials S is arranged at a lower portion of the image forming apparatus 100. The recording material S fed from the cassette 9 is conveyed by a conveyance roller 91 toward a registration roller 92. A leading edge of the recording material S abuts against the registration roller 92 in a stopped state and forms a loop, by which skewing of the recording material S is corrected. Thereafter, the registration roller 92 is rotated at a matched timing with the toner image on the intermediate transfer belt 51, by which the recording material S is conveyed to the secondary transfer portion T2.

A process of forming a full four-color image by the image forming apparatus 100 configured as above will be described. At first, when an image forming operation is started, the surface of the rotating photosensitive drum 1 is charged uniformly by the charging roller 2. Next, the photosensitive drum 1 is exposed by laser beams corresponding to an image signal output from an exposing unit 3. Thereby, an electrostatic latent image corresponding to the image signal is formed on the photosensitive drum 1. The electrostatic latent image on the photosensitive drum 1 is formed into a visible image by toner serving as developer stored in the developing apparatus 4.

The toner image formed on the photosensitive drum 1 is primarily transferred to the intermediate transfer belt 51 at a primary transfer portion T1 (refer to FIG. 2) formed between the photosensitive drum 1 and the primary transfer roller 52 with the intermediate transfer belt 51 intervened. In this state, a primary transfer bias is applied to the primary transfer roller 52. After primary transfer, transfer residual toner, which is toner remaining on the surface of the photosensitive drum 1, is removed by the cleaning device 7.

This operation is performed sequentially in the respective image forming units corresponding to yellow, magenta, cyan and black, and the four toner images are superposed on the intermediate transfer belt 51. Thereafter, at a matched timing with the formation of the toner image, the recording material S stored in the cassette 9 is conveyed to the secondary transfer portion T2. Then, the four-colored toner image on the intermediate transfer belt 51 is collectively secondarily transferred to the recording material S by applying a secondary transfer bias to the secondary transfer outer roller 54. The toner remaining on the intermediate transfer belt 51 without being transferred at the secondary transfer portion T2 is removed by an intermediate transfer belt cleaner 55.

Next, the recording material S is conveyed to a fixing unit 6 serving as the fixing portion. The fixing unit 6 includes a fixing roller 61 having a heat source such as a halogen heater in an interior thereof, and a pressure roller 62, wherein a fixing nip portion is formed by the fixing roller 61 and the pressure roller 62. The recording material S having a toner image transferred thereto is passed through the fixing nip portion of the fixing unit 6, where the recording material S is heated and pressed. Thereby, toner on the recording material S is melted, mixed, and fixed to the recording material S as a full-color image. Thereafter, the recording material S is discharged by a sheet discharge roller 101 onto a sheet discharge tray 102. Thus, the sequence of image forming processes is completed.

The image forming apparatus 100 according to the present embodiment can also form a single-color or multi-color image using one or more image forming units corresponding to the desired color, such as using black to form a black-color image.

Developing Apparatus

Figure 3:
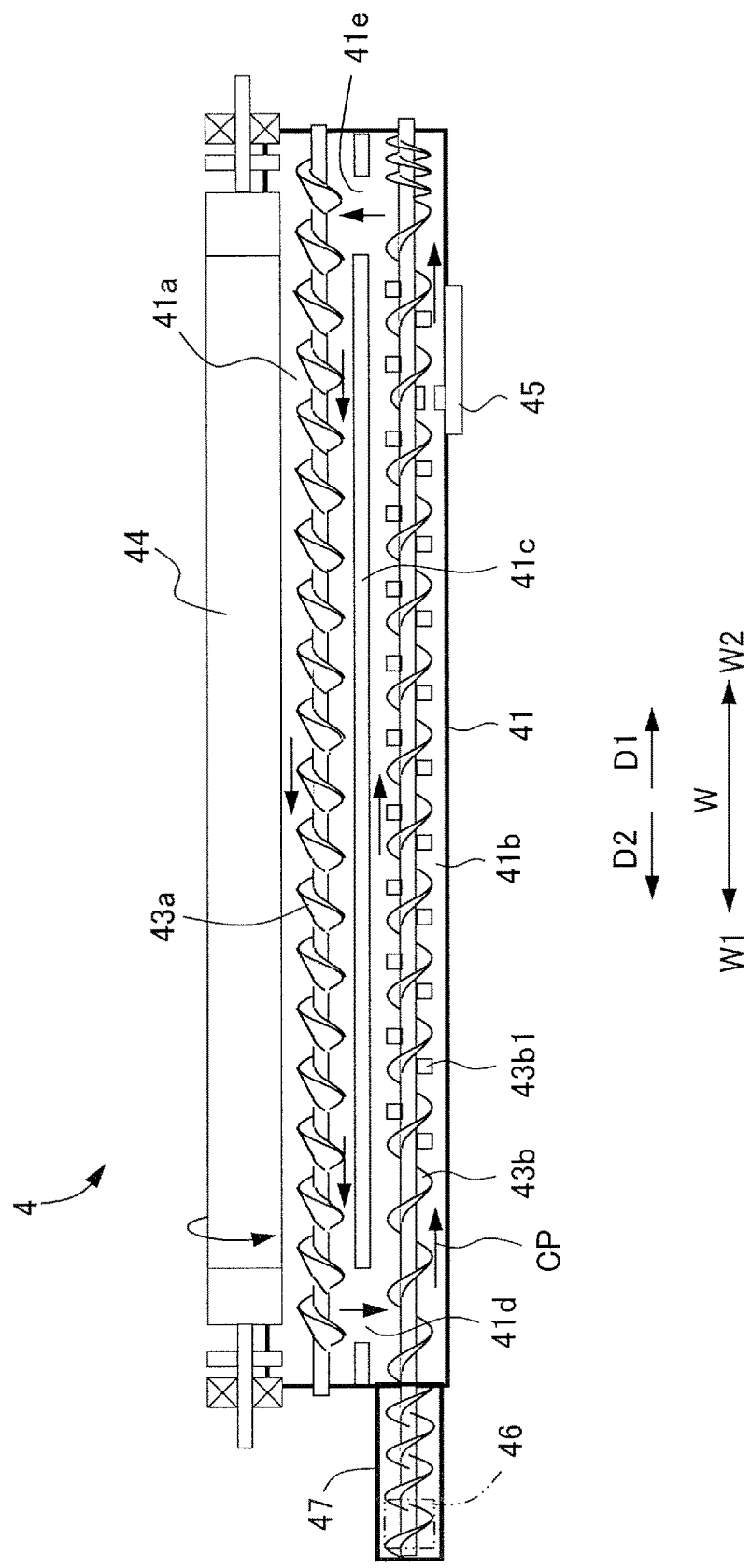
FIG. 3 is a schematic cross-sectional view in which the developing apparatus according to the first embodiment is cut at a horizontal plane.

Next, a detailed configuration of the developing apparatus 4 will be described with reference to FIGS. 2 and 3. The developing apparatus 4 includes a developer container 41 that stores developer containing nonmagnetic toner and magnetic carrier, and a developing sleeve 44 serving as a developer bearing member that bears developer stored in the developer container and rotates. First and second conveyance screws 43b and 43a as developer conveyance members are arranged in the developer container 41 for agitating, conveying and circulating the developer in the developer container 41. The developing sleeve 44 can convey developer to an opposed area A1 opposed to the photosensitive drum 1. A magnet 44a serving as a magnetic flux generating portion having a plurality of magnetic poles in a circumferential direction is arranged non-rotatably in the inner portion of the developing sleeve 44. Further, a developing blade 42 serving as a regulation member that forms a thin layer of developer on the surface of the developing sleeve 44 is provided. In FIG. 3, a longitudinal direction of the developing sleeve 44, that is, an axial direction of the developing sleeve 44 as the rotational axis direction, is referred to as a width direction W.

An approximate center area of an inner side of the developer container 41 is separated by a partition wall 41c serving as a wall portion extending in a direction perpendicular to a plane of the sheet of the drawing, the inner side divided in left and right areas in a horizontal direction into a developing chamber, i.e., second chamber 41a, and an agitating chamber, i.e., first chamber, 41b, and the developer is stored in the developing chamber 41a and the agitating chamber 41b. The developing chamber 41a is provided to supply developer to the developing sleeve 44. The developer container 41 includes the partition wall 41c that separates the developing chamber 41a and the agitating chamber 41b and stores developer, and as illustrated in FIG. 3, the developing chamber 41a and the agitating chamber 41b store developer and form a circulation path CP of the developer. Conveyance screws, i.e., conveyance portions, 43a and 43b are respectively arranged in the developing chamber 41a and the agitating chamber 41b. That is, the conveyance screws 43a and 43b circulate and convey developer in the developing chamber 41a and the agitating chamber 41b. A first communicating portion 41d and a second communicating portion 41e that allow developer to be communicated between the developing chamber 41a and the agitating chamber 41b are provided on both end portions in a longitudinal direction of the partition wall 41c, that is, on both end portions in a rotational axis direction of the developing sleeve 44. Therefore, the partition wall 41c is provided between the first communicating portion 41d and the second communicating portion 41e in the rotational axis direction of the developing sleeve 44, and the partition wall 41c is provided in the developer container 41 to separate the agitating chamber 41b and the developing chamber 41a.

The conveyance screws 43a and 43b have helical blades serving as conveyance portions respectively provided around a rotation shaft formed of magnetic substance. Further, in addition to the helical blade, the first conveyance screw 43b is provided with agitating ribs 43b1 protruding radially from the rotation shaft and having a predetermined width in a developer conveyance direction. The agitating ribs 43b1 agitate the developer by the rotation of the rotation shaft.

The second conveyance screw 43a serving as a second conveyance member is arranged at a bottom of the developing chamber 41a along a rotational axis direction of the developing sleeve 44, and in a state where a rotation shaft of the second conveyance screw 43a is rotated by a motor not shown, it conveys the developer in the developing chamber 41a along the rotational axis direction and supplies the developer to the developing sleeve 44. The developer borne on the developing sleeve 44 and having toner consumed in a developing process is collected in the developing chamber 41a. That is, the second conveyance screw 43a is provided in the developing chamber 41a, and conveys the developer in a second direction D2 opposite to a first direction D1, from the second communicating portion 41e toward the first communicating portion 41d.

The first conveyance screw 43b serving as a first conveyance member is arranged at a bottom of the agitating chamber 41b along the rotation axis direction of the developing sleeve 44, and conveys the developer in the agitating chamber 41b along the rotational axis direction in the opposite direction as the second conveyance screw 43a. That is, the first conveyance screw 43b is provided in the agitating chamber 41b, and conveys the developer in the first direction D1 from the first communicating portion 41d toward the second communicating portion 41e. The developer is conveyed in this manner by the conveyance screws 43a and 43b, and circulates in the developer container 41 through the first and second communicating portions 41d and 41e.

In the developing apparatus 4, the direction in which developer is conveyed in the agitating chamber 41b from the first communicating portion 41d to the second communicating portion 41e is referred to as a first direction D1, and the direction in which the developer is conveyed in the developing chamber 41a in a direction opposite to the first direction D1 is referred to as a second direction D2. The developing apparatus 4 includes a replenishing portion 47 communicated with an upstream portion in the first direction D1 of the agitating chamber 41b, that replenishes developer to the upstream portion of the agitating chamber 41b replenished from the exterior of the developing apparatus 4. The replenishing portion 47 is provided to protrude from the agitating chamber 41b of the developer container 41 toward the upstream side in the first direction D1 and replenishes developer into the agitating chamber 41b, and houses a first end portion of the first conveyance screw 43b. A developer replenishing port 46 through which developer containing toner is replenished to the developer container 41 is provided on an upstream end in the first direction D1 of the replenishing portion 47. The developer replenishing port 46 is connected to a replenishment conveyance portion 83 of the developer replenishing device 80 illustrated in FIG. 4 described later. Therefore, the replenished developer is supplied from the developer replenishing device 80 through the replenishment conveyance portion 83, the developer replenishing port 46 and the replenishing portion 47 into the agitating chamber 41b. The first conveyance screw 43b agitates and conveys the developer replenished from the developer replenishing port 46 and the developer already existing in the agitating chamber 41b, and uniformizes the toner density.

Therefore, due to the conveying force of the conveyance screws 43a and 43b, the developer within the developing chamber 41a having toner consumed in the developing process and having a lower toner density is moved through the first communicating portion 41d (left side W1 of FIG. 3) into the agitating chamber 41b. Then, the developer having moved to the agitating chamber 41b is agitated with replenished developer and conveyed, and moved through the second communicating portion 41e (right side W2 of FIG. 3) to the developing chamber 41a. In other words, according to the present embodiment, the first communicating portion 41d is a communicating portion through which circulated developer is communicated from the developing chamber 41a to the agitating chamber 41b, and the first communicating portion 41d communicates with the developing chamber 41a at an upstream position in the first direction D1 of the agitating chamber 41b in the circulation path CP. Further, the second communicating portion 41e communicates with the developing chamber 41a at a downstream position in the first direction D1 of the agitating chamber 41b in the circulation path CP. That is, the first and second communicating portions 41d and 41e that communicate the developing chamber 41a and the agitating chamber 41b are formed on the partition wall 41c, and they constitute the circulation path CP of developer within the developer container 41.

As illustrated in FIG. 2, an opening portion 41h is formed to the opposed area A1 opposing the photosensitive drum 1 in the developing chamber 41a of the developer container 41, that is, at a position corresponding to the developing area, and in the opening portion 41h, the developing sleeve 44 is rotatably arranged so that a portion thereof is exposed toward the photosensitive drum 1. Meanwhile, the magnet 44a contained in the developing sleeve 44 is fixed non-rotatably with respect to the developer container 41. The developing sleeve 44 is rotated by a motor not shown to convey the developer to the opposed area A1, and supplies the developer to the photosensitive drum 1 at the opposed area A1. In the present embodiment, the developing sleeve 44 is a nonmagnetic material, such as aluminum or stainless steel, formed in a cylindrical shape. Further, the developing sleeve 44 rotates upward in a gravity direction in the opposed area A1, that is, rotates in a counterclockwise direction in FIG. 2.

The developing blade 42 serving as a regulation member that regulates the amount of developer borne on the developing sleeve 44 is fixed to the opening portion 41h of the developer container 41 at an upstream side in the direction of rotation of the developing sleeve 44. Since the developing sleeve 44 rotates upward in the gravity direction in the opposed area A1, the developing blade 42 is positioned at a lower position in the gravity direction of the opposed area A1.

The magnet 44a is formed in the shape of a roller, and has five magnetic poles S1, S2, S3, N1 and N2 in the circumferential direction. The developer in the developing chamber 41a is supplied to the developing sleeve 44 by the second conveyance screw 43a, and a given amount of developer supplied to the developing sleeve 44 is borne on the developing sleeve 44 by magnetic field generated by the magnetic pole S2 for adhesion of the magnet 44a, thereby forming a developer reservoir.

The developer on the developing sleeve 44 passes the developer reservoir by the rotation of the developing sleeve 44, and the developer is raised in a bristle state by the magnetic pole N1 for regulation, the thickness of the developer being regulated by the developing blade 42 opposed to the magnetic pole N1 for regulation. The developer having a regulated layer thickness is conveyed to the opposed area A1 opposed to the photosensitive drum 1, and the developer is raised in a bristle state by the magnetic pole S1 for developing, and forms magnetic bristles. The magnetic bristles contact the photosensitive drum 1 that rotates in the same direction as the developing sleeve 44 at the opposed area A1, and the electrostatic latent image is developed as toner image by charged toner.

Thereafter, the developer on the developing sleeve 44 is conveyed to the developer container 41 by rotation of the developing sleeve 44 while maintaining adhesion to the surface of the developing sleeve 44 by the magnetic pole N2 for conveyance. Then, the developer borne on the developing sleeve 44 is separated from the surface of the developing sleeve 44 by the magnetic pole S3 for separation, and collected in the developing chamber 41*a* of the developer container 41.

As illustrated in FIG. 3, an inductance sensor 45 serving as a toner density sensor that detects toner density in the developer container 41 is provided in the developer container 41. In the present embodiment, the inductance sensor 45 is provided on the downstream side in the developer conveyance direction, that is, the first direction D1, in the agitating chamber 41*b*.

Developer Replenishing Device

Figure 4:
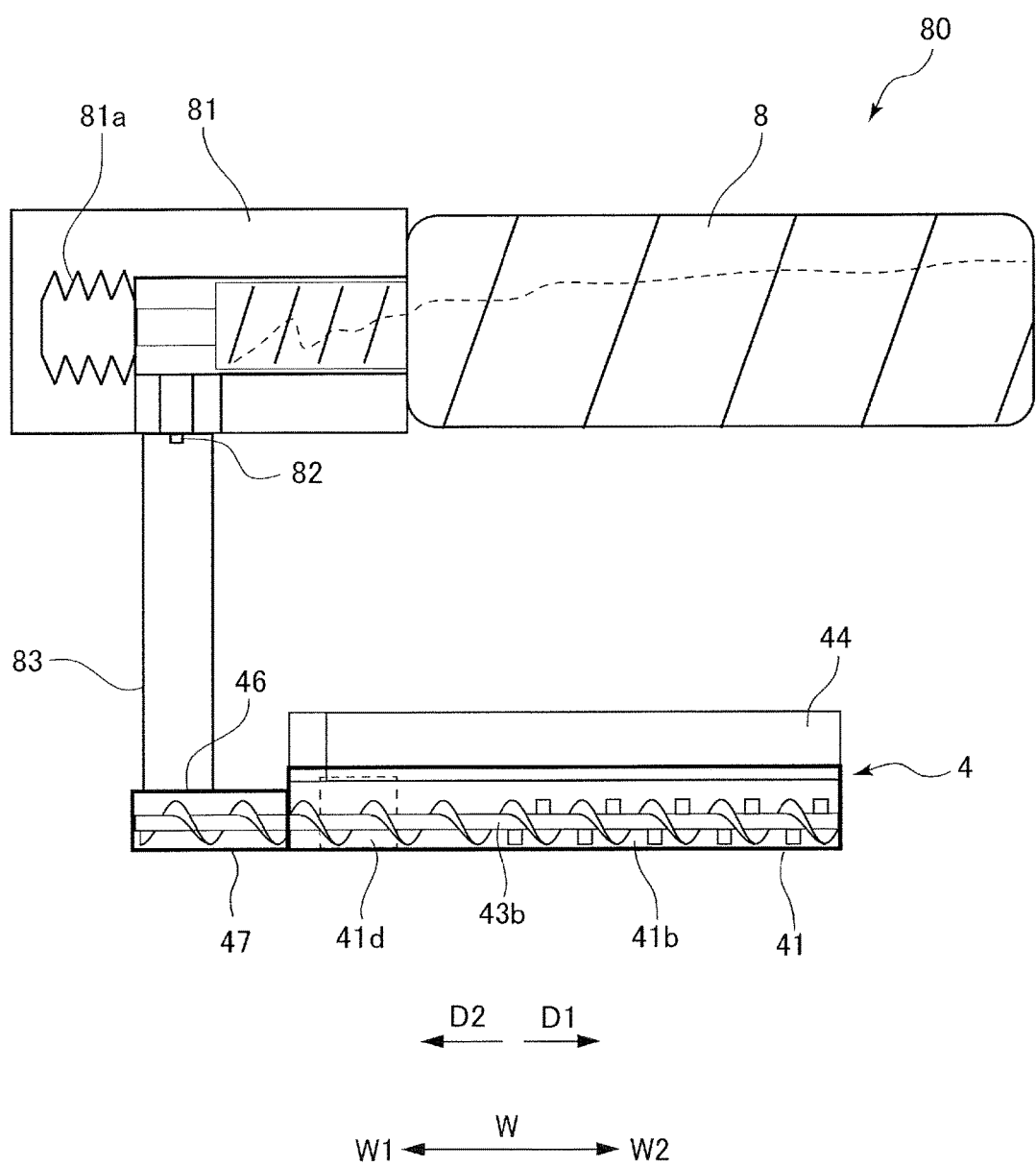
FIG. 4 is a schematic cross-sectional view of a replenishing device and the developing apparatus according to the first embodiment.

Next, a developer replenishing device 80 will be described with reference to FIG. 4. The developer replenishing device 80 includes a storage container, i.e., replenishing developer container 8, that stores replenished developer, a replenishing mechanism 81 and a replenishment conveyance portion 83, and replenishes developer to the replenishing portion 47. The storage container 8 adopts a configuration in which helical grooves are formed on an inner wall of a cylindrical container, and in a state where the whole storage container 8 rotates, a conveyance force of developer to the longitudinal direction, that is, the rotational axis direction, is generated. The downstream end in the developer conveyance direction of the storage container 8 is connected to the replenishing mechanism 81. The replenishing mechanism 81 includes a pump portion 81*a* that discharges developer from the storage container 8 through a discharge port 82. The pump portion 81*a* is formed in a bellows shape, and when driven to rotate, volume of the pump portion 81*a* is changed and air pressure is generated, by which the developer conveyed fro An upper end portion of the replenishment conveyance portion 83 is connected to the discharge port 82, and a lower end portion of the replenishment conveyance portion 83 is connected to the developer replenishing port 46 of the replenishing portion 47 in the developing apparatus 4. That is, the replenishment conveyance portion 83 communicates the discharge port 82 and the developer replenishing port 46. Therefore, the developer discharged through the discharge port 82 by the pump portion 81*a* is passed through the replenishment conveyance portion 83 and replenished into the developer container 41 of the developing apparatus 4. In other words, the pump portion 81*a* can generate airflow, and the airflow conveys the developer from the storage container 8 to the agitating chamber 41*b*.

In the developing apparatus 4 described above, the replenishing portion 47 having the developer replenishing port 46 is provided upstream in the developer conveyance direction, that is, the first direction D1, of the agitating chamber 41*b* and on an outer side of the circulation path CP of developer formed of the developing chamber 41*a* (refer to FIG. 3) and the agitating chamber 41*b*. Specifically, the replenishing portion 47 having the developer replenishing port 46 is provided upstream in the developer conveyance direction, that is, the first direction D1, further from the first communicating portion 41*d* of the agitating chamber 41*b*. Therefore, very little developer exists in the circulation path CP of the developer in the replenishing portion 47, and only the replenished developer is passed therethrough.

Replenishment of developer by the developer replenishing device 80 is performed by automatic toner replenisher control (hereinafter referred to as ATR control). The ATR control controls the operation of the developer replenishing device 80 and replenishes developer to the developing apparatus 4 according to image ratio during image forming, a detection result of the inductance sensor 45, and a detection result of density of a patch image detected by a density sensor 103 (refer to FIG. 1) of the toner image.

As illustrated in FIG. 1, the density sensor 103 is arranged to oppose the surface of the intermediate transfer belt 51 at a position downstream of the image forming unit PK arranged most downstream of the image forming units and upstream of the secondary transfer portion T2 with respect to the direction of rotation of the intermediate transfer belt 51. In the control using the density sensor 103, for example, the patch image serving as the toner image for control is transferred to the intermediate transfer belt 51 at a certain timing, such as start of an image forming job or each time after image has been formed to a predetermined number of sheets, and the concentration of the patch image is detected by the density sensor 103. Based on the detection result, replenishing control of developer by the developer replenishing device 80 is performed.

The configuration for replenishing developer to the developing apparatus 4 is not restricted to this configuration, and other configurations known hitherto can be used. For example, a developer replenishing port serving as a replenishing portion is formed on an upper side at the upstream portion in the first direction D1 of the agitating chamber 41*b*, and developer can be replenished to the developer replenishing port from the replenishment conveyance portion 83. In this case, the developer replenishing port replenishes the developer replenished from the exterior of the developing apparatus 4 to an upstream portion of the agitating chamber 41*b*.

Scattering of Developer

Now, the scattering of developer generated from the developing apparatus will be described. At first, in the image forming apparatus, in addition to the demands for increased speed and improvement of image quality of the output image, there is a demand for simplified maintenance. One of the methods for simplifying maintenance is reduction of developer contamination within the image forming apparatus. If the interior of the image forming apparatus is contaminated by developer, image defects such as contamination of output image may occur, and cleaning operations may become necessary when replacing the developing apparatus or photosensitive drum unit. If developer adheres to a gear or other drive systems, slipping and the like may occur to the drive system.

One of the causes of such contamination by developer within the image forming apparatus is generation of airflow from inside the developing apparatus 4 to the exterior thereof, by which the developer stored in the developing apparatus 4 may scatter to the exterior of the developing apparatus 4 by airflow. For example, in the developing apparatus 4, the members being driven are the developing sleeve 44, the second conveyance screw 43*a* and the first conveyance screw 43*b*, and the rotation of these members causes airflow within the developing apparatus 4. The member most dominant to airflow in the developing apparatus 4 among these members is the developing sleeve 44. In a state where the developing sleeve 44 is rotated, a flow is created in which air is introduced from the exterior of the developing apparatus 4 into the interior thereof, circulated in the developing chamber 41*a*, and discharged along the partition wall 41*c* and the developer container 41 to the exterior of the developing apparatus 4.

Further, one of the causes that create airflow in the developing apparatus 4 is replenishment. A condition in which toner scattering by the replenishment operation is caused is where there is a distance in a height direction, i.e., height difference, between the storage container 8 of the developer replenishing device 80 and the developer replenishing port 46 of the developing apparatus 4. In this case, airflow may occur and toner may scatter by the impact of the replenished developer falling to the developer replenishing port 46 of the developing apparatus 4. Further, as one condition in which toner scattering by replenishment occurs is a configuration in which replenished developer is conveyed using airflow or pressure, such as according to the pump portion 81a. Even if the configuration of an element, such as the pump portion 81a, itself is the cause of toner scattering, the impact caused by falling of developer may cause toner scattering. Therefore, the amount of toner scattering when the configuration of the pump portion 81a is adopted is greater than the configuration without the pump portion 81a, such that it is an important problem to be solved.

According to the conventional configuration, the replenished developer replenished with airflow from the developer replenishing port 46 of the developing apparatus 4 normally flows in air from the first communicating portion 41d closest to the developer replenishing port 46 toward the developing sleeve 44. The floating developer is carried along with the current of air generated by the developing sleeve 44, and is conveyed to the exterior of the developing apparatus 4 through a shortest path. Therefore, a large amount of toner scatters to the exterior of the developing apparatus 4. Therefore, in the present embodiment, the configuration regarding the scattering of toner generated by replenishing the replenished developer will be described, and specifically, the configuration for reducing toner scattering caused by the replenished toner by the shape of the partition wall 41c separating the developing chamber 41a and the agitating chamber 41b will be disclosed.

Developer Container Configuration According to Present Embodiment

Figure 5:
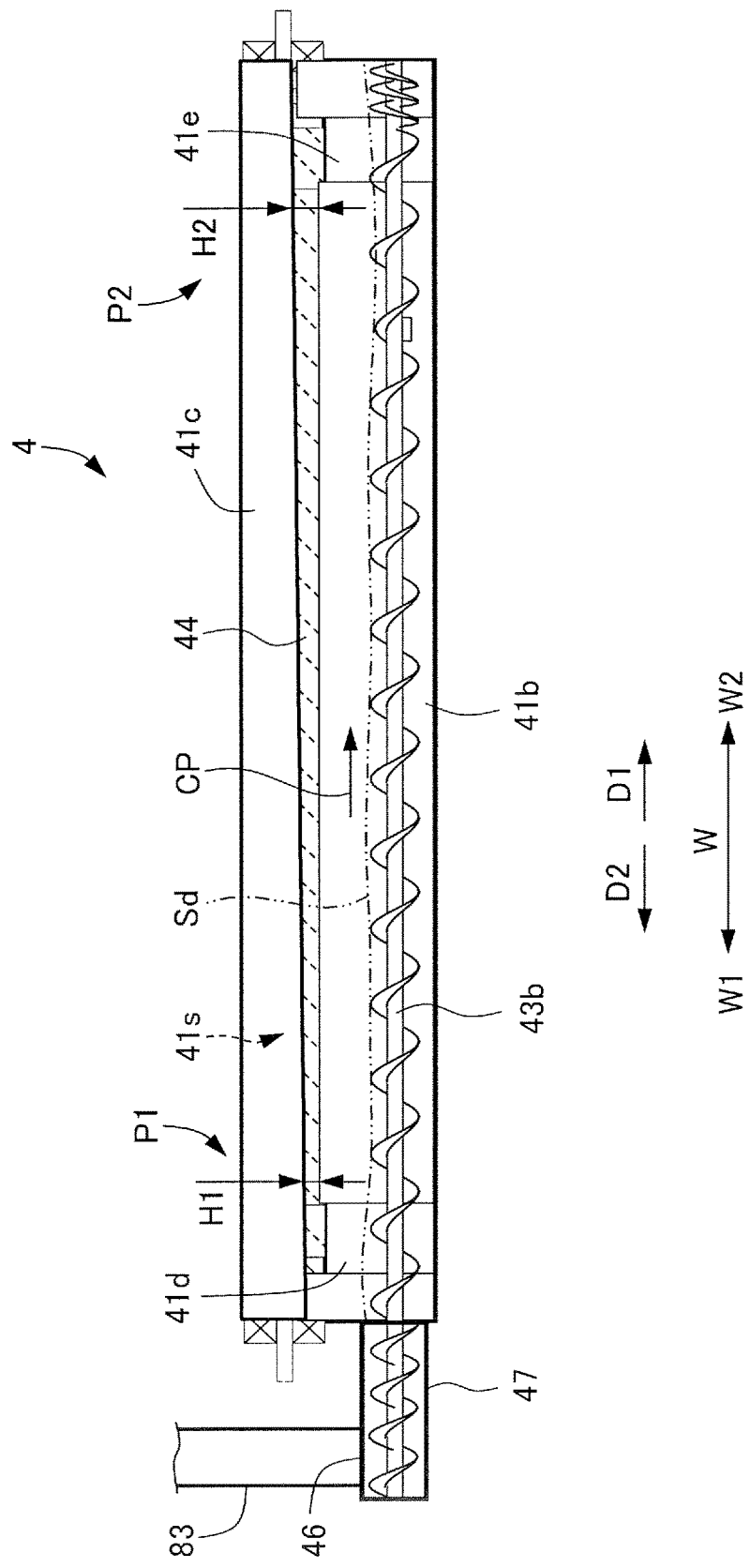
FIG. 5 is a schematic vertical cross-sectional view of the developing apparatus according to the first embodiment.
Figure 6:
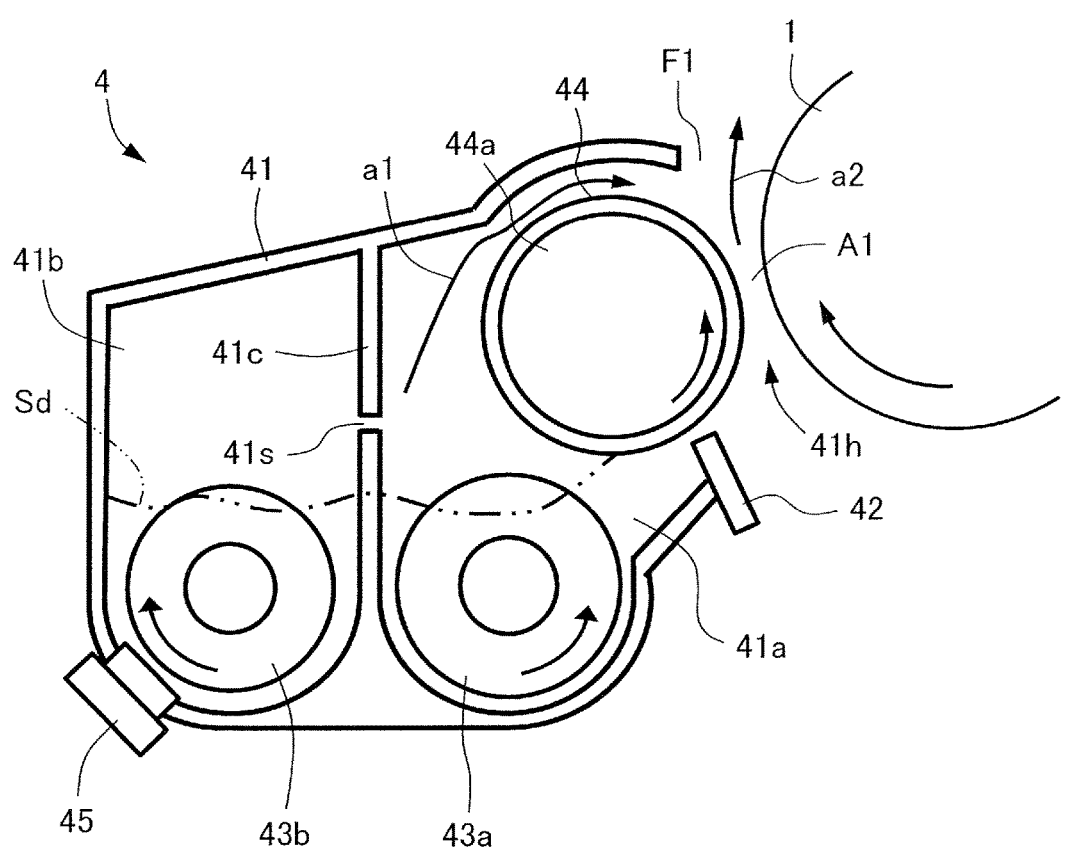
FIG. 6 is a schematic horizontal cross-sectional view of the developing apparatus according to the first embodiment.

Now, the configuration of the developing apparatus 4 according to the present embodiment will be described with reference to FIGS. 5 and 6. According to the present embodiment, the partition wall 41c includes a slit 41s serving as an air vent portion that communicates the developing chamber 41a and the agitating chamber 41b. That is, as illustrated in FIG. 5, the slit 41s is positioned such that at least a portion thereof is placed between the first and second communicating portions 41d and 41e in the first direction D1. The slit 41s communicates the developing chamber 41a and the agitating chamber 41b at a position upward than the first conveyance screw 43b in the height direction of the partition wall 41c orthogonal to the first direction D1. In other words, the slit 41s is provided on the partition wall 41c at a position higher than the height of the first conveyance screw 43b and the height of the second conveyance screw 43a in the vertical direction, and vents air between the agitating chamber 41b and the developing chamber 41a. In the present embodiment, the slit 41s communicates the developing chamber 41a and the agitating chamber 41b between the upstream and downstream positions of the developing chamber 41a (refer to FIG. 6) in the circulation path CP at an upper area than a developer surface Sd of the developer circulated in the circulation path CP. The slit 41s is a single air vent portion provided along the first direction D1, provided consecutively from the upstream position to the downstream position in the agitating chamber 41b, and in the present embodiment, the slit 41s is arranged to extend in the first direction D1 from an upper portion of the first communicating portion 41d to an upper portion of the second communicating portion 41e. Since the slit 41s is provided upward than the respective upper end portions of the conveyance screws 43a and 43b, that is, provided at a higher position than the heights of the respective conveyance screws 43a and 43b in the vertical direction, it becomes possible to suppress developer from moving between the agitating chamber 41b and the developing chamber 41a through the slit 41s, and to realize appropriate agitation and conveyance of the developer.

According to the present embodiment, the slit 41s is configured such that the slit 41s is narrow and low toward the first communicating portion 41d near the developer replenishing port 46 and wider and higher toward the second communicating portion 41e distant from the developer replenishing port 46. That is, the downstream portion of the slit 41s in the circulation path CP of the agitating chamber 41b is wider than the upstream portion of the slit 41s in the height direction along the partition wall 41c. Height direction refers to a direction along the partition wall 41c orthogonal to the width direction W, for example, but in the present embodiment, it refers approximately to a gravity direction. That is, the slit 41s has a first opening width H1 in the height direction along the partition wall 41c at the first position P1 in the first direction D1, and has a second opening width H2 higher than the first opening width H1 at a second position P2 in the downstream side of the first direction D1 than the first position P1. Further, the slit 41s is designed such that an opening width serving as the opening width is gradually widened from the upstream side toward the downstream side in the agitating chamber 41b, that is, designed such that the opening width is consecutively increased along the first direction D1 from the first position P1 to the second position P2.

As the opening width narrows, pressure loss that occurs between the wall surface when air passes the slit 41s is increased, and as the opening widens, the amount of airflow that passes through the opening is increased. That is, the pressure loss of air flowing from the agitating chamber 41b to the developing chamber 41a at the second position P2 of the slit 41s on the downstream side of the first position P1 in the first direction D1 is smaller than the pressure loss of air flowing from the agitating chamber 41b to the developing chamber 41a at the first position P1 of the slit 41s. Therefore, by providing a path through which air flows in the form of a slit 41s to the partition wall 41c, it becomes possible to reduce concentration of airflow at the first communicating portion 41d, that has occurred according to the conventional configuration, and airflow also occurs on the downstream side of the agitating chamber 41b.

If a wide slit 41s is provided from the most upstream portion of the agitating chamber 41b close to the first communicating portion 41d, the airflow that occurs by replenishing toner is flown into the developing chamber 41a at the area close to the first communicating portion 41d. The effect of reducing toner scattering caused by replenishment is reduced by this configuration, but if there is no slit 41s on the upstream side of the agitating chamber 41b, there will be no action drawing the airflow toward the downstream side of the agitating chamber 41b from the first communicating portion 41d. Therefore, it is preferable to provide the slit 41s that is narrower at the upstream side and gets wider at the downstream side of the agitating chamber 41b. By adopting such configuration of the slit 41s, it becomes possible to generate airflow that reaches the downstream side of the agitating chamber 41b, and when replenished toner is scattered in the air within the developer container 41, the toner can be dispersed in the downstream direction of the agitating chamber 41b. Then, the toner dispersed in the air falls during the process of flowing in the agitating chamber 41b and mixes into the developer circulated in the circulation path CP, such that toner scattered to the exterior of the developing apparatus 4 is reduced.

As described above, the developing apparatus 4 of the present embodiment includes the slit 41s that communicates the agitating chamber 41b and the developing chamber 41a between the upstream and downstream positions of the agitating chamber 41b in the circulation path CP at an upper area than the developer surface Sd of the developer circulated in the circulation path CP. Thereby, airflow can be generated in the agitating chamber 41b from the upstream position toward the downstream position, and for example, scattering of developer can be suppressed sufficiently with respect to a specific cause such as replenishment of toner. Even if the developer is scattered, the amount of scattering is small, and the amount of developer that may be adhered to the image is so small that it is almost invisible, such that the quality of the image will not be deteriorated.

According to the developing apparatus 4 of the present embodiment, there is only one slit 41s, and it is provided consecutively from the upstream position to the downstream position of the agitating chamber 41b. Therefore, the pressure loss of air in the agitating chamber 41b by the slit 41s can be varied moderately along the circulating direction, such that the flow of air reaching the downstream portion of the agitating chamber 41b without stopping in midway of the agitating chamber 41b can be created.

According further to the developing apparatus 4 of the present embodiment, the downstream portion of the slit 41s in the circulation path CP of agitating chamber 41b is set wider than the upstream portion of the slit 41s with respect to the direction of height along the partition wall 41c. According to this configuration, airflow that is generated by the replenishment of toner is suppressed from flowing toward the developing chamber 41a at the area near the first communicating portion 41d, and airflow that reaches the downstream portion of the agitating chamber 41b can be generated.

Furthermore, the developing apparatus 4 of the present embodiment includes the pump portion 81a that can generate airflow, and that conveys developer from the storage container 8 to the agitating chamber 41b by airflow. Therefore, the developing apparatus 4 according to the present embodiment can be applied to the developer replenishing device 80 that includes the pump portion 81a. Thereby, airflow within the developing apparatus 4 is further stabilized, and a high quality developing apparatus 4 capable of further reducing toner scattering can be provided.

Figure 15A:
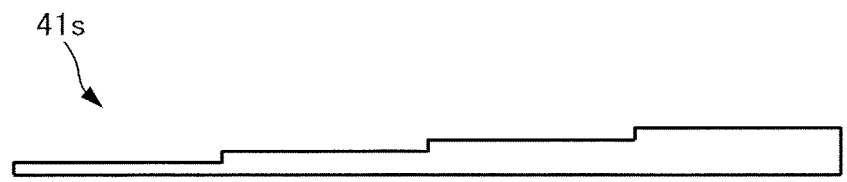
FIG. 15A is a schematic vertical cross-sectional view of a modified example of the developing apparatus according to the first embodiment, having one air vent portion with an opening width that is varied in steps.
Figure 15B:
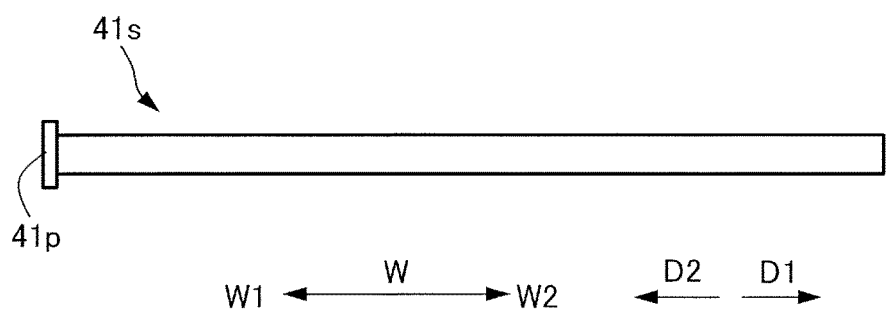
FIG. 15B is a schematic vertical cross-sectional view of a modified example of the developing apparatus according to the first embodiment, having one air vent portion with a fixed opening width.

The present embodiment described above illustrates a case in which the slit 41s has an opening width that is gradually widened from the upstream side toward the downstream side in the agitating chamber 41b, but the present invention is not restricted to this example. For example, as illustrated in FIG. 15A, the single slit 41s can be designed such that the opening width is widened in steps from the upstream side toward the downstream side of the agitating chamber 41b along the first direction D1, that is, that the opening width is increased in steps. Even in this case, it is possible to suppress airflow generated by replenishing toner from flowing near the first communicating portion 41d to the developer chamber 41a, and generate a flow of air that reaches the downstream side of the agitating chamber 41b. In another example, as illustrated in FIG. 15B, the single slit 41s can have a fixed opening width along the first direction D1. In that case, compared to a case where the slit 41s is not provided, airflow directed from the upstream area toward the downstream area of the agitating chamber 41b can be generated, such that scattering of developer can be suppressed sufficiently even with respect to a specific cause such as replenishment of developer.

According further to the above-described embodiment, a case has been described where there is one slit 41s that serves as the air vent portion and that is provided consecutively from the upstream position to the downstream position of the agitating chamber 41b, but the present invention is not restricted to this example. For example, a plurality of slits 41s serving as the air vent portion can be provided along the first direction D1. That is, a plurality of slits 41s can be provided intermittently from the upstream position toward the downstream position of the agitating chamber 41b along the first direction D1 of the circulation path CP. In this case, the respective slits 41s can each be designed with the opening width gradually widened, or with a fixed width with respect to the direction of height along the partition wall 41c.

Figure 7:
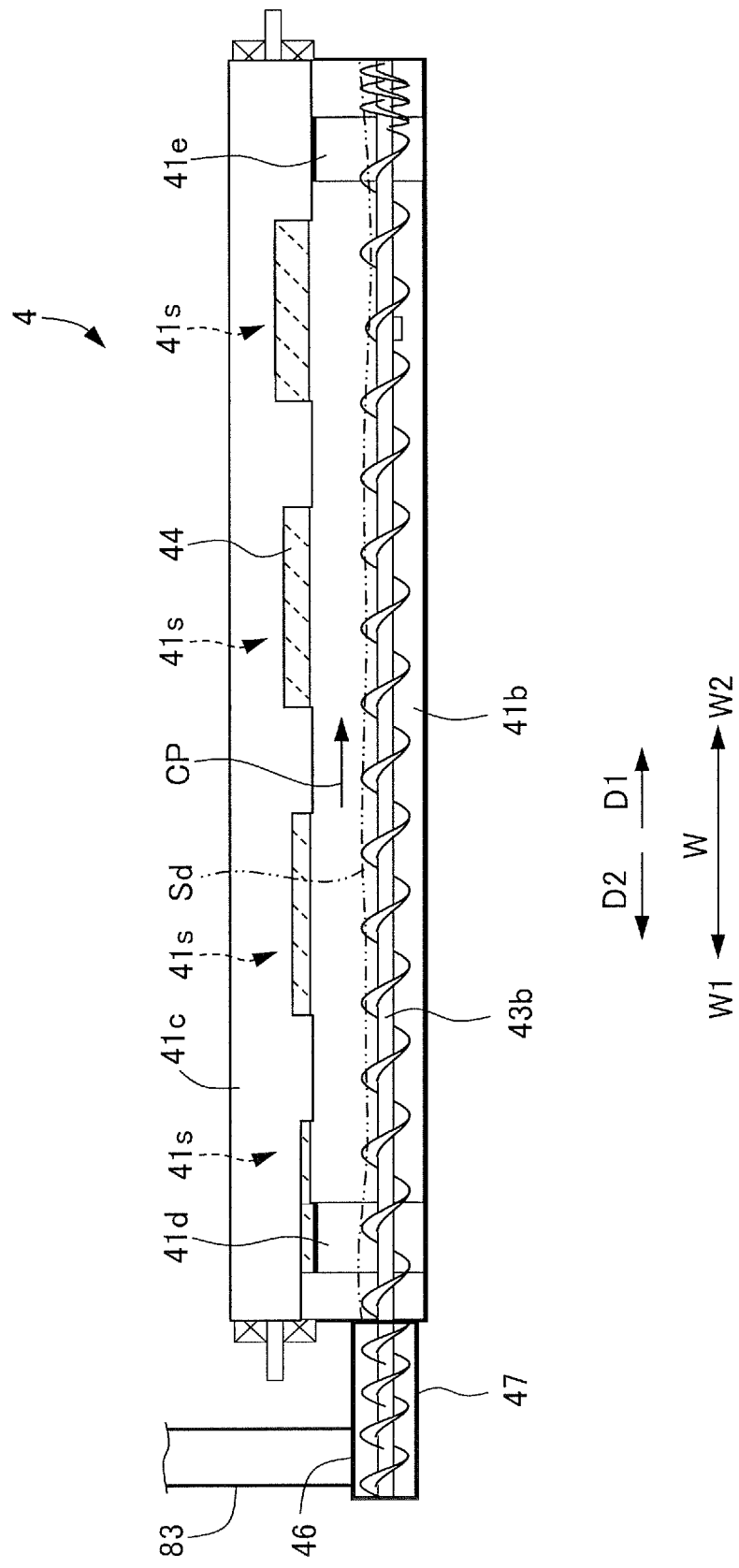
FIG. 7 is a schematic vertical cross-sectional view of a modified example of the developing apparatus according to the first embodiment, having a plurality of air vent portions in which each air vent portion has a fixed opening width.
Figure 15C:
FIG. 15C is a schematic vertical cross-sectional view of a modified example of the developing apparatus according to the first embodiment, having a plurality of air vent portions with consecutive opening widths.
Figure 15D:
FIG. 15D is a schematic vertical cross-sectional view of a modified example of the developing apparatus according to the first embodiment, having a plurality of air vent portions with a fixed opening width.

For example, as illustrated in FIG. 7, a plurality of slits 41s, four in the illustrated example, are provided intermittently along the first direction D1 of the circulation path CP. In the present example, the slits 41s have respectively fixed opening widths in the direction of height along the partition wall 41c, and the opening width of the slit 41s positioned at the downstream side is set higher than the opening width of the slit 41s positioned at the upstream side. In another example, as illustrated in FIG. 15C, the respective slits 41s can be designed to have opening widths that are increased consecutively along the first direction D1. In any of the examples, it becomes possible to suppress the airflow that is generated by toner replenishment to flow toward the developing chamber 41a at the area close to the first communicating portion 41d, and to generate airflow reaching the downstream side of the agitating chamber 41b. In another example, as illustrated in FIG. 15D, all the slits 41s can have a fixed opening width along the first direction D1. In this example, compared to the case where no slit 41s is provided, airflow directed from the upstream position toward the downstream position of the agitating chamber 41b can be generated, such that the developer scattering can be suppressed sufficiently even with respect to a specific cause such as replenishment of developer. An example where four slits 41s are provided has been described, but the number of slits are not restricted to four.

COMPARATIVE EXPERIMENT

Next, an experiment comparing the configuration of a comparative example with the configuration of the present embodiment will be described in order to confirm the effect of the present embodiment. The experiment measured the amount of toner scattering near the opening portion of the developer container and confirmed toner contamination in the circumference of the developing apparatus in a state where an operation to replenish toner to the respective developing apparatuses has been performed. At first, an outline of a method for measuring an amount of toner scattering adopted in the present experiment will be described with reference to FIG. 6. An apparatus used for the experiment was formed by removing and assembling the developing apparatus, the photosensitive drum and the configurations excluding the exposing unit around the photosensitive drum. In the experiment, the amount of toner scattering was measured in a state where rotation and charging of the photosensitive drum and the driving and application of bias for developing images were performed similarly as a normal image forming process.

In the area excluding both ends in the width direction W of the developing apparatus 4, the toner scattered in the developing chamber 41a is passed through a gap between the developing sleeve 44 and the developer container 41 by airflow a1, and scattered to the exterior of the developing apparatus 4 by airflow a2 directed upward along the photosensitive drum 1. Line laser is selectively irradiated to the upstream side and the downstream side in the width direction W of the gap between the developing sleeve 44 and the photosensitive drum 1 such that it is perpendicular to gap F1 formed between the photosensitive drum 1 and the upper end of the developer container 41. Line laser is laser that is irradiated in a line having a fixed line width and forming a two-dimensional flat fan-shaped optical path. Normally, such line laser is formed by scattering dot laser in a fixed direction using cylindrical lens or rod lens. The scattered toner flying on the optical path of the line laser scatters the laser beam. Therefore, the number and trajectory of scattered toner that exists in the range of laser irradiation can be measured by observation using a high speed camera and the like from a direction approximately perpendicular to the direction of irradiation of the line laser.

A YAG laser (DPGL-5W) manufactured by Japan Laser Corporation was used as light source of the line laser. An optical system using a cylindrical lens attached to the product was adjusted to have a line width of 0.5 mm at gap F1, and laser was irradiated. A highspeed camera SA-3 manufactured by Photron Corporation was used for observation. Photographic conditions, such as frame rate or exposure time, of the highspeed camera and the optical system, such as the lens, were selected to enable scattered toner on the line laser to be observed.

The number of scattered toners passing the upstream portion and the downstream portion of the gap F1 in the width direction W obtained by the above-descried method was converted into a number of scattered toner corresponding to one sheet of A4-size paper (210 mm×297 mm), based on line width and observation time. The upstream portion of the gap F1 in the width direction W is the portion corresponding to the first communicating portion 41d, and the downstream portion of the gap F1 in the width direction W is the portion corresponding to the second communicating portion 41e.

Example 1

The developing apparatus 4 of the first embodiment described earlier was used. The slit 41s was formed to have a length of 305 mm with respect to the width direction W from the first communicating portion 41d to the second communicating portion 41e, and configured to have an interval that is widened gradually and linearly from the upstream portion toward the downstream portion. The slit width, i.e., opening width, at the upstream edge was 1 mm, and the slit width at the downstream edge was 5 mm. If the slit width is too wide, the developer removed from the developing sleeve 44 may fly beyond the partition wall 41c from the developing chamber 41a and collected in the agitating chamber 41b. The balance of developer circulation may be deteriorated, so that the slit width should preferably be 5 mm at most.

COMPARATIVE EXAMPLE

A developing apparatus without slits formed on the partition wall 41c was used. The other configurations are the same as the first embodiment.

Figure 14:
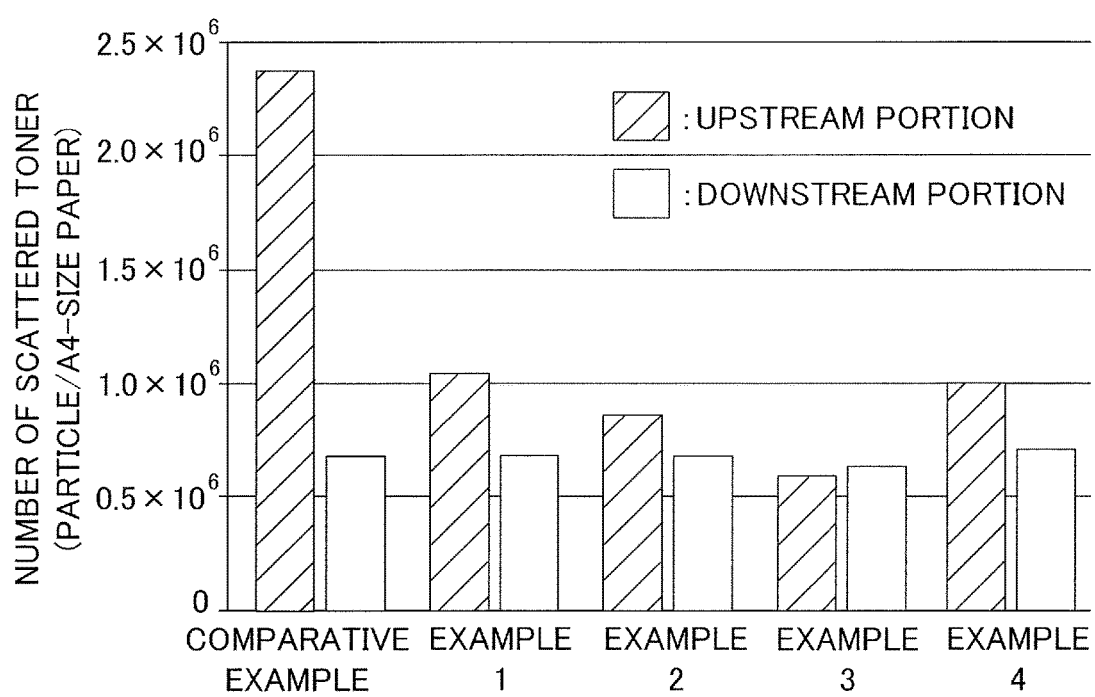
FIG. 14 is a graph illustrating results of comparative experiments.

Experiments were performed based on the conditions mentioned above, and the results were compared. The result of the experiment is illustrated in FIG. 14. The number of scattered toner in Example 1 was equivalent to the comparative example at the downstream portion, but reduced significantly than the comparative example at the upstream portion, and the ability to suppress scattering was improved significantly. Accordingly, the configuration of Example 1 was confirmed to be effective in reducing toner scattering compared to the comparative example.

Second Embodiment

Figure 8:
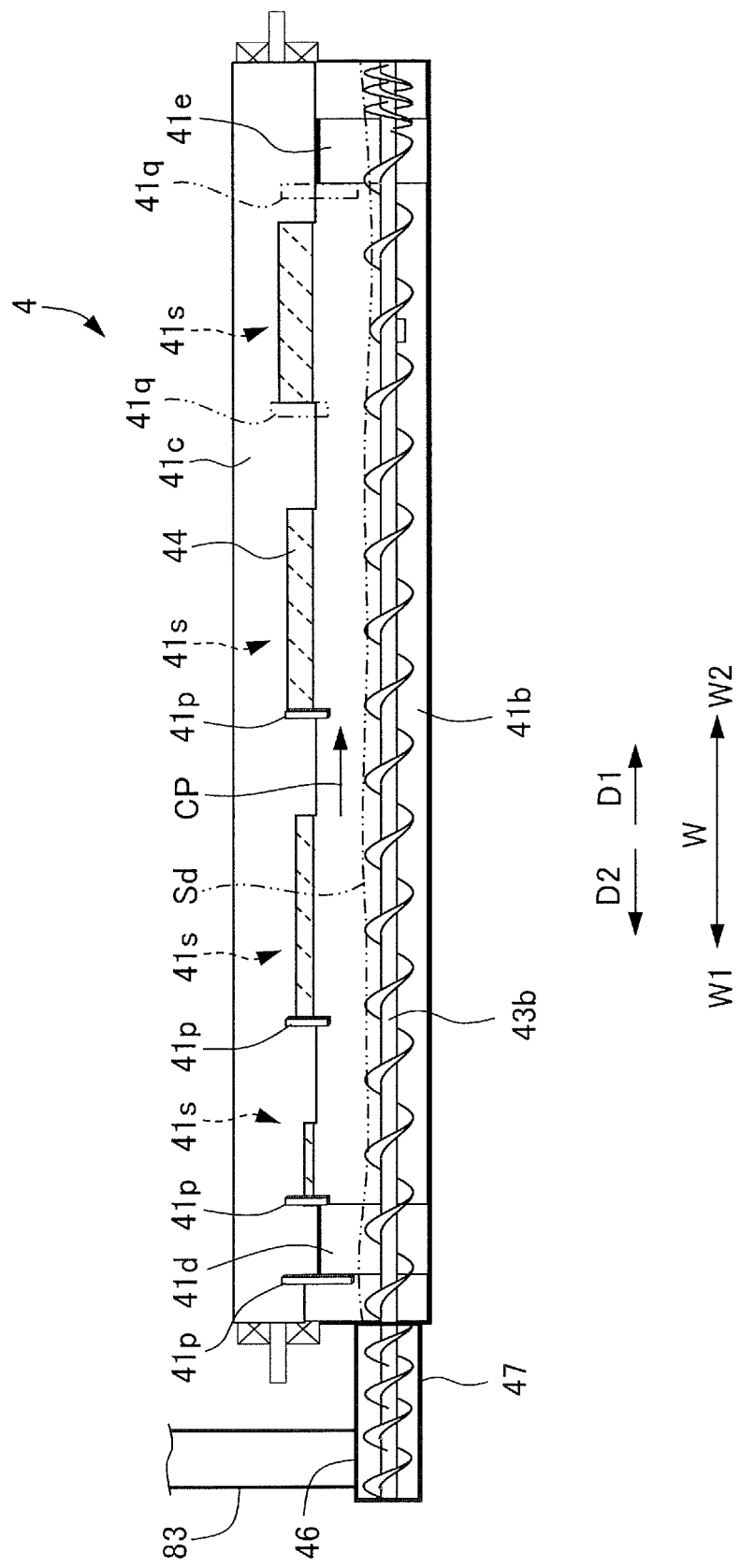
FIG. 8 is a schematic vertical cross-sectional view of a developing apparatus according to a second embodiment.
Figure 9A:
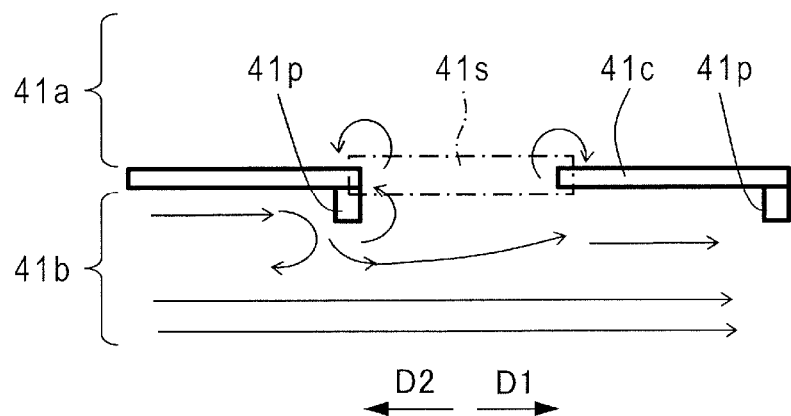
FIG. 9A is a schematic cross-sectional view in which the developing apparatus according to the second embodiment is cut at a horizontal plane.

Next, a second embodiment of the present invention will be described in detail with reference to FIGS. 8 and 9A. The configuration of the present embodiment differs from the first embodiment in that the partition wall 41c has projections 41p provided at end portions of the slits 41s on the upstream side in the first direction D1. The other configurations are similar to the first embodiment, so that they are denoted with the same reference numbers and descriptions thereof are omitted.

In the present embodiment, the partition wall 41c has projections 41p that protrude to the inner side of the agitating chamber 41b from upstream edge portions of the slits 41s in the first direction D1 of the circulation path CP in the agitating chamber 41b. Each projection 41p is provided along the direction of height of the edge portion of each slit 41s on the upstream edge portion in the first direction D1 of the slit 41s. In the present embodiment, each projection 41p is a square column having a 1.5 mm square cross-section, and it is arranged with the longitudinal direction arranged in the vertical direction.

Figure 9B:
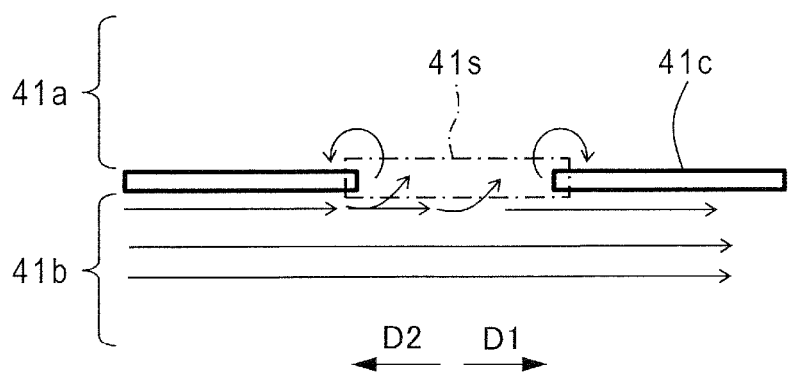
FIG. 9B is a schematic cross-sectional view in which a developing apparatus according to a prior art is cut at a horizontal plane.
Figure 10:
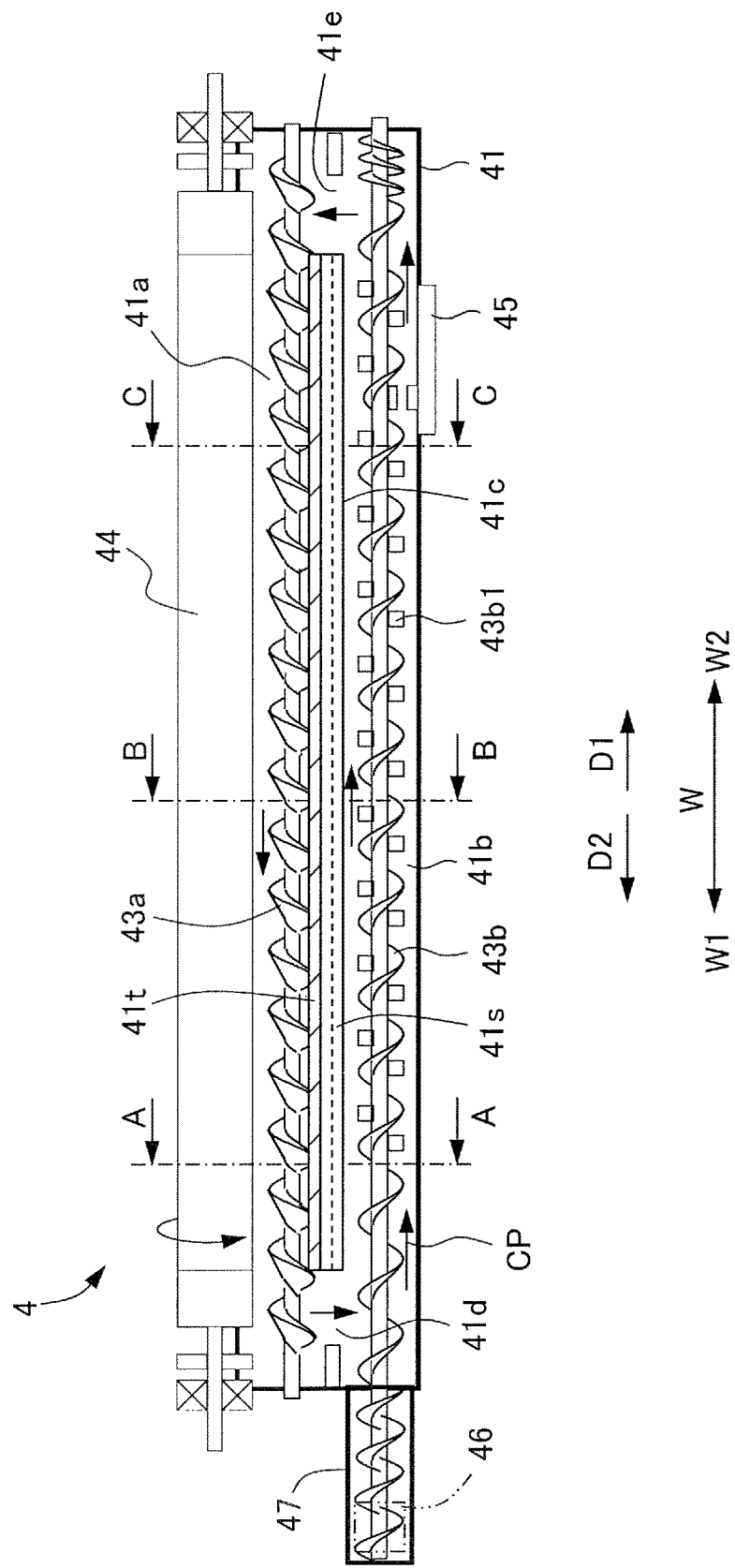
FIG. 10 is a schematic cross-sectional view in which a developing apparatus according to a third embodiment is cut at a horizontal plane.

Each projection 41p is arranged on the upstream side of airflow of each slit 41s, that is, on the side closer to the developer replenishing port 46 of the slit 41s. When airflow collides against the projection 41p, as illustrated by the arrow of FIG. 9A, vortex is generated around the projection 41p, and airflow is separated from the partition wall 41c, thereby creating a resistance to the airflow flowing from the agitating chamber 41b toward the developing chamber 41a, and causing pressure loss. Thereby, airflow through the slit 41s toward the developing chamber 41a is somewhat suppressed, and airflow to the downstream side of the agitating chamber 41b is increased, with the airflow speed reduced. Therefore, the toner scattered in the developing apparatus 4 falls and mixes into the developer while passing through the agitating chamber 41b, and toner scattering to the exterior of the developing apparatus 4 can be reduced. As illustrated in FIG. 9B, if there are no projections 41p, vortex will not be generated on the upstream side of the slit 41s, such that airflow along the partition wall 41c will not be separated from the partition wall 41c, and airflow through the slit 41s to the developing chamber 41a is increased.

In the present embodiment, slits 41s are provided at four areas along the first direction D1, and projections 41p formed as a square column having a 1.5 mm square cross-section are provided with the longitudinal direction arranged in the vertical direction on upstream edge portions of the three slits 41s on the upstream side in the first direction D1 and the first communicating portion 41d. That is, the partition wall 41c has projection 41p that protrudes to the inner side of the agitating chamber 41b disposed at the upstream edge portion in the first direction D1 on the slit 41s most upstream in the first direction D1 of the plurality of slits 41s, and at the upstream edge portion in the first direction D1 on the first communicating portion 41d. The projections 41p are not provided on the slit 41s positioned most downstream and on the second communicating portion 41e, so as not to create pressure loss. The partition wall 41c has flat portions 41q that are flush with the wall surface of the partition wall 41c on the upstream edge portion in the first direction D1 of the slit 41s positioned most downstream in the first direction D1 of the plurality of slits 41s and on the upstream edge portion of the second communicating portion 41e. The present embodiment illustrates an example where projections 41p are provided on three slits 41s starting from the most upstream side in the first direction D1, and no projection 41p is provided on the slit 41s position most downstream, but the present invention is not restricted to this example, and the projection 41p should at least be provided on one slit 41s, or projections 41p can be provided on all slits 41s.

Also according to the developing apparatus 4 of the present embodiment, the slits 41s communicating the agitating chamber 41b and the developing chamber 41a are provided between the upstream position and the downstream position of the agitating chamber 41b in the circulation path CP at an upper area than a developer surface Sd of the developer circulated in the circulation path CP. Thereby, airflow from the upstream position directed toward the downstream position can be generated in the agitating chamber 41b, such that scattering of developer can be suppressed sufficiently even with respect to a specific cause such as replenishment of toner. Even if the developer is scattered, the amount of scattering is small, and the amount of developer that may be adhered to the image is so small and almost invisible, such that the quality of the image will not be deteriorated.

According further to the developing apparatus 4 of the present embodiment, the partition wall 41c has projections 41p formed on upstream edge portions of the slits 41s. Therefore, the toner scattered in the developing apparatus 4 falls and mixes into the developer while passing through the agitating chamber 41b, and toner scattering to the exterior of the developing apparatus 4 can be reduced. According further to the developing apparatus 4 of the present embodiment, flat portions 41q are provided instead of projections 41p on the upstream edge portions of the most downstream slit 41s and the second communicating portion 41e. Thereby, the pressure loss of air flowing from the agitating chamber 41b to the developing chamber 41a at the second position P2 of the slit 41s on the downstream side in the first direction D1 of the first position P1 is set smaller than the pressure loss of air flowing from the agitating chamber 41b to the developing chamber 41a at the first position P1 of the slit 41s. Therefore, it becomes possible to cause airflow directed from the upstream position toward the downstream position in the agitating chamber 41b to be generated more effectively while reducing pressure loss at the downstream side in the first direction D1 of the agitating chamber 41b.

The above-described embodiment has described a case where projections 41p are provided on upstream end portions in the first direction D1 of at least a portion of slits 41s among the plurality of slits 41s, but the present invention is not restricted to this example. For example, as illustrated in FIG. 15B, the projection 41p can be provided at the upstream edge portion in the first direction D1 of a single slit 41s.

Example 2

A similar experiment as Example 1 described above was performed using the developing apparatus 4 of the second embodiment described above. In the example, slits 41s were disposed longitudinally at four areas, and projections 41p formed as a square column having a 1.5 mm square cross-section were provided with the longitudinal direction arranged in the vertical direction on upstream edge portions of the slits 41s and the first communicating portion 41d. The projections 41p were not provided on the most downstream slit 41s and on the second communicating portion 41e, so as not to create pressure loss. The other configurations were similar to Example 1. The result of the experiment is illustrated in FIG. 14. The number of scattered toner in Example 2 was equivalent to the comparative example at the downstream portion, but reduced significantly than the comparative example at the upstream portion, and slightly reduced than Example 1, such that in general, the ability to suppress scattering was improved significantly. Accordingly, the configuration of Example 2 was confirmed to be effective in reducing toner scattering compared to the comparative example.

Third Embodiment

Next, a third embodiment of the present invention is described in detail with reference to FIG. 10 and FIGS. 11A through 11C. The configuration of the present embodiment differs from that of the first embodiment in that an overlapped portion 41t arranged such that at least a portion thereof overlaps with the slit 41s is provided with respect to the communicating direction of the slit 41s in the developer container 41. The other configurations are similar to the first embodiment, such that the components are denoted with the same reference numbers, and detailed descriptions thereof are omitted.

The present embodiment adopts a slit 41s similar to the first embodiment, and provides an overlapped portion 41t. The overlapped portion 41t is arranged such that at least a portion thereof is overlapped with the slit 41s when viewed from the communicating direction of the slit 41s. By providing the overlapped portion 41t, the distance of passage of airflow a1 from the slit 41s to the gap F1 is extended to increase pressure loss at the upstream side of the agitating chamber 41b, while the pressure loss from the slit 41s to the gap F1 is reduced at the downstream side of the agitating chamber 41b. Thereby, airflow to the downstream side of the agitating chamber 41b is increased. For example, if the distance of passage of airflow a1 is long, as expressed in expression 3 described later, pressure loss caused by friction on the wall surface is increased, and the energy of airflow is reduced significantly by the curved passage causing the airflow to collide against the wall surfaces. Thereby, airflow to the downstream side having smaller pressure loss is increased in the agitating chamber 41b.

Figure 11A:
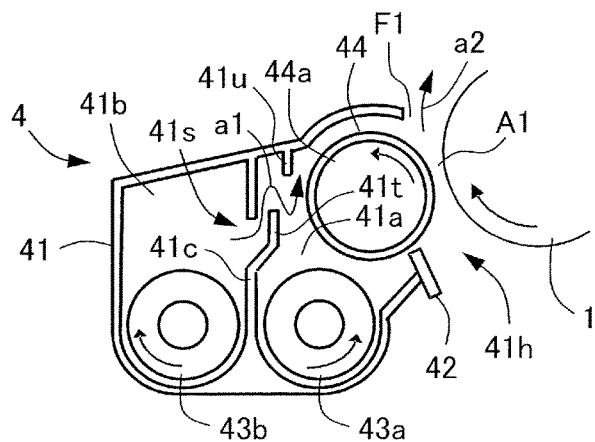
FIG. 11A is a schematic horizontal cross-sectional view in which the developing apparatus of FIG. 10 is cut at line A-A.

At the upstream portion of the agitating chamber 41b (line A-A of FIG. 10), the overlapped portion 41t is arranged to overlap approximately with the whole opening width of the slit 41s from the lower edge portion of the slit 41s to the upper direction at the developing chamber 41a side, as illustrated in FIG. 11A. Further, an upper overlapped portion 41u that extends downward from a top surface of the developer container 41 is provided on the inner side of the overlapped portion 41t in the developing chamber 41a at a distance from the overlapped portion 41t. As described, a labyrinth structure is formed by providing the overlapped portion 41t and the upper overlapped portion 41u on the developing chamber 41a side of the slit 41s, with the overlapped portion 41t and the upper overlapped portion 41u serving as baffle plates and extending the passage length. Thereby, the pressure loss of airflow passing through the slit 41s is increased.

Figure 11B:
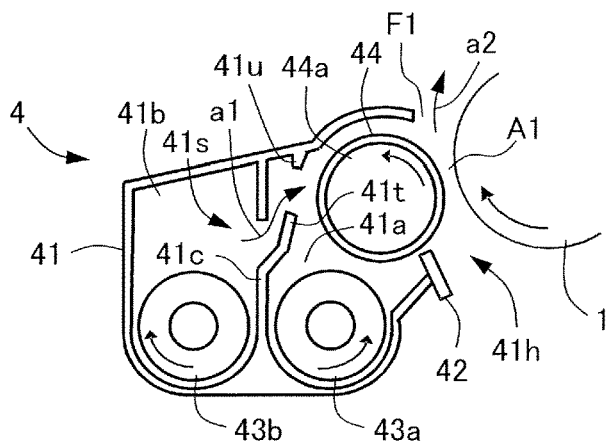
FIG. 11B is a schematic horizontal cross-sectional view in which the developing apparatus of FIG. 10 is cut at line B-B.

At a center portion of the agitating chamber 41b (line B-B in FIG. 10), the overlapped portion 41t extending obliquely upward from the lower edge portion of the slit 41s toward the developing sleeve 44 on the developing chamber 41a side is arranged to be overlapped approximately with the whole opening width of the slit 41s, as illustrated in FIG. 11B. Moreover, the upper overlapped portion 41u extending downward from the top surface of the developer container 41 toward the overlapped portion 41t is provided at a distance from the overlapped portion 41t on the inner side of the developing chamber 41a of the overlapped portion 41t. Here, the passage length of the airflow a1 is set shorter than that at the upstream portion of the agitating chamber 41b.

Figure 11C:
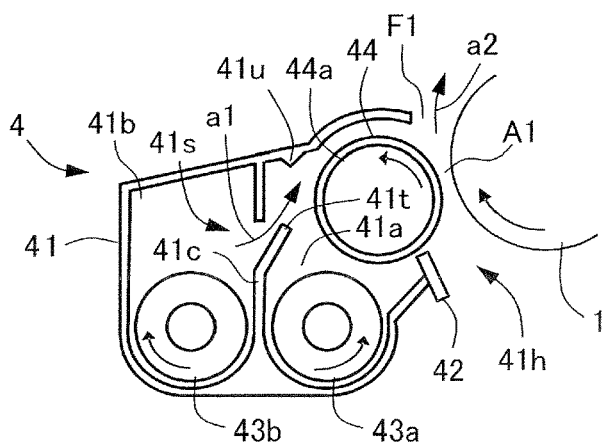
FIG. 11C is a schematic horizontal cross-sectional view in which the developing apparatus of FIG. 10 is cut at line C-C.

Further, at the downstream portion of the agitating chamber 41b (line C-C of FIG. 10), the overlapped portion 41t extending obliquely upward from the lower edge portion of the slit 41s toward the developing sleeve 44 on the developing chamber 41a side is arranged to be overlapped approximately lower than the whole opening width of the slit 41s, as illustrated in FIG. 11C. Here, almost no upper overlapped portion 41u is formed, and the airflow a1 flows through the slit 41s approximately linearly to the gap F1.

Specifically, at the upstream portion of the agitating chamber 41b, for example, an opening width of the slit 41s is set to 5 mm, and the lower edge of the slit 41s is bent and extended obliquely upward toward the developing sleeve 44. Further, from the upper end thereof, the overlapped portion 41t is bent and extended upward at a position horizontally separated by 2 mm from the slit 41s, and the upper end is formed to be positioned 1 mm upward than the upper edge of the slit 41s. At the center portion of the agitating chamber 41b, the overlapped portion 41t is designed to be gradually inclined toward the developing sleeve 44 as it approaches the downstream side. Further, at the downstream portion of the agitating chamber 41b, the overlapped portion 41t is arranged along a tangential direction of the developing sleeve 44. The arrangement of the overlapped portion 41t can be varied consecutively in the longitudinal direction, or varied in steps. The present embodiment adopts a configuration in which the arrangement is varied consecutively.

As described, the shape of the overlapped portion 41t is designed to be varied from a labyrinth structure to a linear structure toward the downstream side in the agitating chamber 41b. Thereby, the pressure loss of air flowing through the slit 41s from the agitating chamber 41b to the developing chamber 41a is greater at the upstream side than the downstream side of the slit 44s in the circulation path CP of the agitating chamber 41b. That is, the pressure loss of air flowing from the agitating chamber 41b to the developing chamber 41a at the second position P2 of the slit 41s on the downstream side in the first direction D1 of the first position P1 is smaller than the pressure loss of air flowing from the agitating chamber 41b to the developing chamber 41a at the first position P1 of the slit 41s. Therefore, airflow toward the downstream side of the agitating chamber 41b having a smaller pressure loss is increased. The toner scattered in the developer replenishing port 46 and contained in the air falls and mixes into the developer circulated in the circulation path CP in the agitating chamber 41b while being conveyed by airflow and reaching the downstream edge, and toner scattering can be reduced. In the configuration of the labyrinth structure, the flow rate can be reduced significantly, such that the scattered toner can fall even during passing of airflow a1. Therefore, the amount of scattered toner reaching the gap between the developing sleeve 44 and the developer container 41 can also be reduced.

Also according to the developing apparatus 4 of the present embodiment, the slit 41s communicating the agitating chamber 41b and the developing chamber 41a is provided between the upstream position and the downstream position of the agitating chamber 41b in the circulation path CP at an upper area than a developer surface Sd of the developer circulated in the circulation path CP. Thereby, airflow directed from the upstream position toward the downstream position of the agitating chamber 41b can be generated, such that the scattering of developer can be suppressed sufficiently even with respect to a specific cause such as replenishment of developer. Even if the developer is scattered, the amount of scattering is small, and the amount of developer that may be adhered to the image is so small that it is almost invisible, such that the quality of the image will not be deteriorated.

Further according to the developing apparatus 4 of the present embodiment, the developer container 41 has the overlapped portion 41t that is arranged such that at least a portion thereof is overlapped with the slit 41s with respect to the communicating direction of the slit 41s. Thereby, the passage length of the airflow a1 from the agitating chamber 41b to the developing chamber 41a can be extended, and the passage of the airflow a1 can be elongated at the upstream side of the agitating chamber 41b, by which pressure loss is increased. Thereby, airflow generated by replenishing toner can be suppressed from flowing toward the developing chamber 41a near the first communicating portion 41d, and create airflow reaching the downstream side of the agitating chamber 41b.

Example 3

A similar experiment as Example 1 described above was performed using the developing apparatus 4 of the third embodiment described above. In this example, slits 41s were disposed longitudinally at four areas, and the slits 41s, the overlapped portions 41t and the upper overlapped portions 41u were formed based on the above-described dimensions. The other configurations were similar to Example 1. The result of the experiment is illustrated in FIG. 14. The number of scattered toner in Example 3 was only slightly reduced compared to the comparative example at the downstream portion, but reduced significantly than the comparative example at the upstream portion, and reduced than Example 1, such that in general, the ability to suppress scattering was improved significantly. Accordingly, the configuration of Example 3 was confirmed to be effective in reducing toner scattering compared to the comparative example.

Fourth Embodiment

Figure 12:
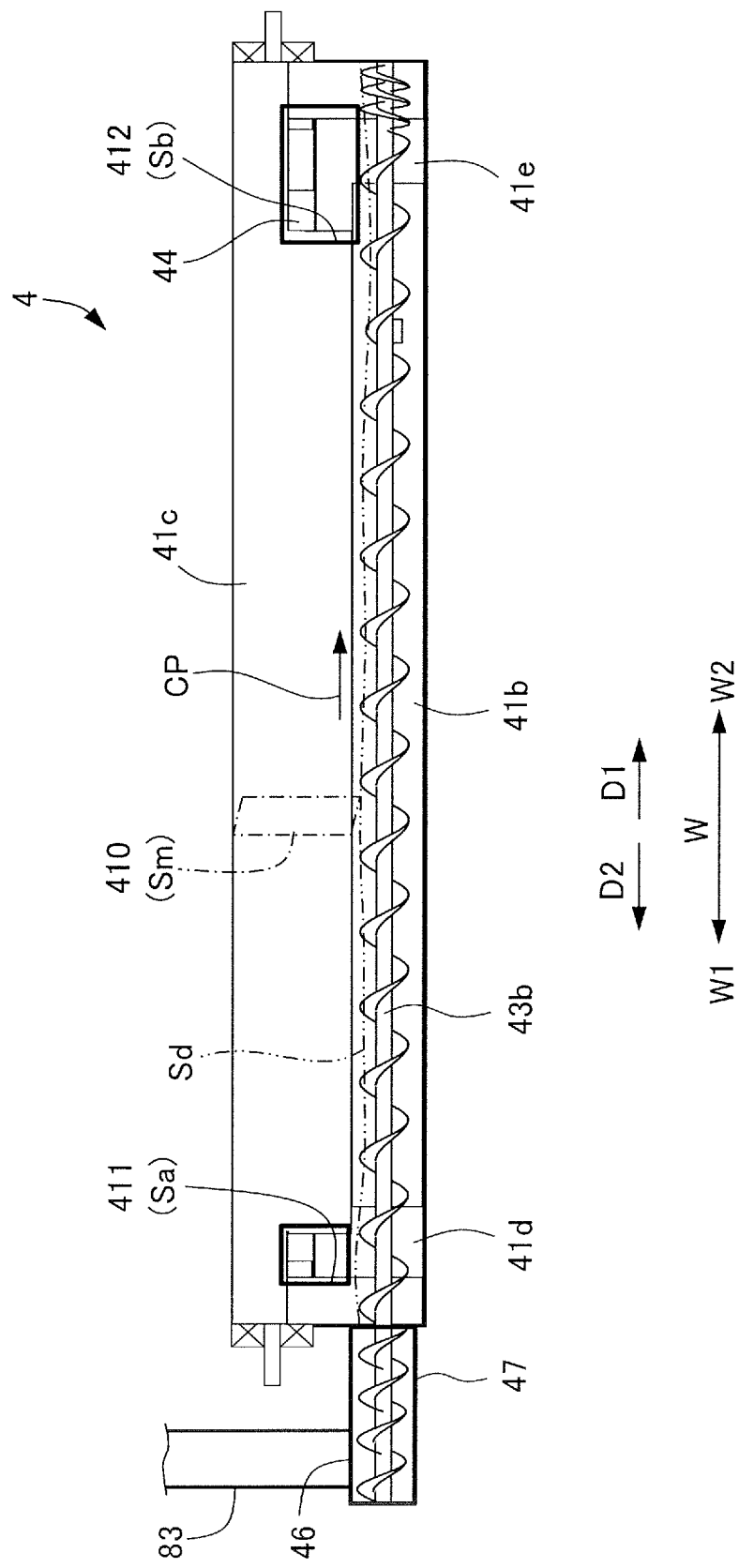
FIG. 12 is a schematic vertical cross-sectional view of a developing apparatus according to a fourth embodiment.
Figure 13:
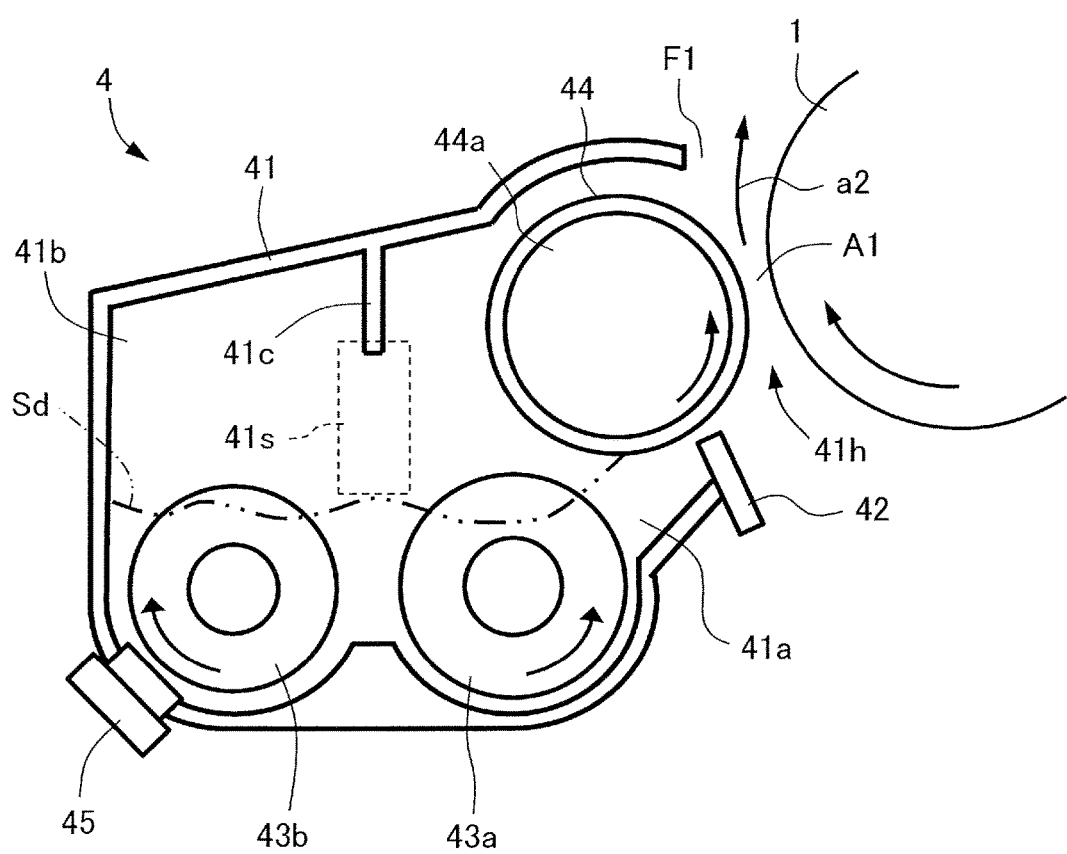
FIG. 13 is a schematic horizontal cross-sectional view of the developing apparatus according to a fourth embodiment.

Next, a fourth embodiment of the present invention will be described in detail with reference to FIGS. 12 and 13. The configuration of the present embodiment differs from the first embodiment in that opening shapes and sizes of the first and second communicating portions 41d and 41e serving as communicating portions of the developing chamber 41a and the agitating chamber 41b are optimized. However, the other configurations are similar to the first embodiment, so that components are denoted with the same reference numbers and detailed descriptions thereof are omitted.

According to the present embodiment, the opening shapes and sizes of the first and second communicating portions 41d and 41e are optimized to generate airflow toward the downstream direction in the agitating chamber 41b, without providing a slit 41s on the partition wall 41c. In the first and second communicating portions 41d and 41e, the area in which developer is communicated between the developing chamber 41a and the agitating chamber 41b is at a lower area in the vertical direction, and the space below the first and second communicating portions 41d and 41e is filled with developer. Meanwhile, airflow can be generated in the upper space of the first and second communicating portions 41d and 41e. In order to reduce scattering of replenished toner, it is necessary to disperse toner supplied from the developer replenishing port 46 and carried by air current, while conveying the toner in the air for a long time to enable the toner to fall and mix in the developer being circulated, similar to the first embodiment. Therefore, the airflow in the agitating chamber 41b must have a small amount of air communicated to the developing chamber 41a at the first communicating portion 41d, and a large amount of air communicated to the developing chamber 41a at the second communicating portion 41e.

In order to move scattered toner on the upstream side of the agitating chamber 41b to the second communicating portion 41e on the downstream side of the agitating chamber 41b, it is necessary to reduce the pressure loss of airflow from the agitating chamber 41b to the developing chamber 41a at the second communicating portion 41e than the pressure loss at the first communicating portion 41d. Since vortex is generated near the separation wall when airflow is communicated from the agitating chamber 41b to the developing chamber 41a through the first and second communicating portions 41d and 41e, pressure loss is generated, and airflow is suppressed.

The pressure loss of the first and second communicating portions 41d and 41e tends to be increased approximately linearly along with the decrease of opening area. The airflow generated by replenishment of toner flows into the developing chamber 41a according to the above-mentioned pressure loss at the position of the first communicating portion 41d if the opening area is large, but tends to flow toward the downstream side in the agitating chamber 41b if the opening area is small. However, if the opening area of the second communicating portion 41e on the downstream side of the agitating chamber 41b is small, the amount of flow to the downstream side of the agitating chamber 41b will be reduced. Therefore, it is necessary to design the opening area of the second communicating portion 41e to be greater than the opening area of the first communicating portion 41d. Thereby, airflow tends to flow toward the second communicating portion 41e having a lower pressure loss than the first communicating portion 41d that has a high pressure loss. The airflow containing scattered toner flows toward the downstream side of the agitating chamber 41b, and the amount of toner fallen and mixed into the developer while flowing in the agitating chamber 41b is increased, while the amount of toner scattered to the exterior of the developing apparatus 4 is reduced.

Now, in the first communicating portion 41d, developer is communicated in the area below the developer surface Sd of the developer circulated in the circulation path CP, while air is communicated through a first upper opening 411, which is an opening above the developer surface Sd, that is, above the respective conveyance screws 43a and 43b. The opening area of the first upper opening 411 is referred to as area Sa. Further, in the second communicating portion 41e, developer is communicated in the area below the developer surface Sd of the developer circulated in the circulation path CP, while air is communicated through a second upper opening 412, which is an opening above the developer surface Sd, that is, above the respective conveyance screws 43a and 43b. The opening area of the second upper opening 412 is referred to as area Sb. As described, according to the present embodiment, the area Sb of the second upper opening 412 of the second communicating portion 41e is greater than the area Sa of the first upper opening 411 of the first communicating portion 41d above the developer surface Sd of the developer circulated in the circulation path CP, that is, above the respective conveyance screws 43a and 43b.

The above-described configuration enables to achieve the effect of suppressing toner scattering compared to the prior-art configuration, and now the conditions of the first and second communicating portions 41d and 41e for achieving a sufficient effect will be described. A small amount of air flows through a path having a large pressure loss, while a large amount of air flows through a path having a small pressure loss. Therefore, air tends to flow toward the downstream side of the agitating chamber 41b as the pressure loss of the first communicating portion 41d increases compared to the pressure loss that occurs when the air passes through the agitating chamber 41b. Further, air tends to flow downstream from the upstream portion of the agitating chamber 41b as the pressure loss that occurs when the air flows from the downstream side of the agitating chamber 41b to the second communicating portion 41e reduces.

Therefore, the following condition is set:

$$A < B + C \quad (1)$$

In the expression (1), A represents pressure loss of the second communicating portion 41e, i.e., downstream of agitating chamber, B represents pressure loss of air flowing downstream from an upstream portion of the agitating chamber 41b, and C represents pressure loss at the first communicating portion 41d, i.e., upstream of agitating chamber. This expression (1) is the condition in which airflow tends to flow to the second communicating portion 41e.

Now, contraction loss $\Delta P_{si}$ of air passing the first communicating portion 41d or the second communicating portion 41e from the agitating chamber 41b is expressed by the following expression:

$$\Delta P_{si} = \xi \rho \frac{v^2}{2} L \quad (2)$$

wherein $\zeta$ represents a coefficient determined by cross-sectional area ratio, v represents flow velocity, and $\rho$ represents density.

If it is assumed that the agitating chamber 41b is a cylindrical pipe, for simplification, the pressure loss of air passing from the first communicating portion 41d to the second communicating portion 41e of the agitating chamber 41b is expressed by the following expression:

$$\Delta P = \lambda \rho \frac{L}{d} \frac{v^2}{2} L \quad (3)$$

wherein $\lambda$ represents pipe friction coefficient, L represents distance between separation walls, and d represents passage diameter.

Further, the area of the first upper opening 411 of the first communicating portion 41d is referred to as Sa, the area of the second upper opening 412 of the second communicating portion 41e is referred to as Sb, Sb−Sa is referred to as ΔS, and the area of upper opening 410 of the path above the developer surface Sd of the agitating chamber 41b, that is, the area above the respective conveyance screws 43a and 43b is referred to as Sm. In this case, the following expression (4) is derived from the above-described expressions (1) through (3).

$$\Delta S > \frac{\lambda L}{1.1957} \sqrt{S_m} L \quad (4)$$

Further, assuming that distance between the first and second communicating portions 41d and 41e is L=270 mm, area Sm of the upper opening 410 of path of the agitating chamber 41b is 400 mm², and airflow of the agitating chamber 41b is a turbulent flow, Reynolds number Re is set to at least 4000. In that case, λ=0.04 and ΔS>180.6 mm². Therefore, a preferable configuration for suppressing toner scattering is realized if the opening area of the second upper opening 412 of the second communicating portion 41e positioned downstream of the first upper opening 411 of the first communicating portion 41d positioned upstream in the agitating chamber 41b is set greater by an area corresponding to a 13.5-mm square area.

In the present embodiment, the cross-sectional area of the upper opening 410 of the path above the developer surface Sd, that is, above the respective conveyance screws 43a and 43b, orthogonal to the circulation path CP between the upstream position and the downstream position in the circulation path CP of the agitating chamber 41b is set to Sm. The area Sm of the upper opening 410 of the path is greater than the area Sa of the first upper opening 411 above the developer surface Sd, that is, above the respective conveyance screws 43a and 43b, of the first communicating portion 41d, and smaller than the area Sb of the second upper opening 412 above the developer surface Sd, that is, above the respective conveyance screws 43a and 43b, of the second communicating portion 41e. Thereby, airflow containing scattered toner flowing toward the downstream side of the agitating chamber 41b increases, and the amount of toner fallen and mixed into the developer while flowing in the agitating chamber 41b is increased effectively, while the amount of toner scattered to the exterior of the developing apparatus 4 is reduced sufficiently.

According to the developer apparatus 4 of the present embodiment, the area Sb of the second communicating portion 41e above the developer surface Sd of the developer circulated in the circulation path CP, that is, above the respective conveyance screws 43a and 43b, is greater than the area Sa of the first communicating portion 41d. Thereby, airflow directed from the upstream position of the agitating chamber 41b toward the downstream position can be generated, such that scattering of developer can be suppressed sufficiently with respect to a specific cause such as replenishment of toner. Even if the developer is scattered, the amount of scattering is small, and the amount of developer that may be adhered to the image is so small that it is almost invisible, such that the quality of the image will not be deteriorated.

According to the developing apparatus 4 of the present embodiment, the area Sm of the upper opening 410 of the path is greater than the area Sa of the first upper opening 411 and smaller than the area Sb of the second upper opening 412. Thereby, the airflow containing scattered toner flows toward the downstream side of the agitating chamber 41b, and the amount of toner fallen and mixed into the developer while flowing in the agitating chamber 41b is increased effectively, while the amount of toner scattered to the exterior of the developing apparatus 4 is reduced sufficiently.

Example 4

A similar experiment as Example 1 described above was performed using the developing apparatus 4 according to the fourth embodiment described above. In the example, the area Sa of the first upper opening 411 of the first communicating portion 41d was set to 100 mm², the area Sb of the second upper opening 412 of the second communicating portion 41e was set to 300 mm², and Sb−Sa=ΔS was set to 200 mm². No slits 41s were provided, and the other configurations were similar to Example 1. The result of experiment is illustrated in FIG. 14. The number of scattered toner in Example 4 was equivalent to Example 1, and the scattering suppressing performance was improved greatly compared to the comparative example. Therefore, it was confirmed that the configuration of Example 4 is effective in reducing toner scattering compared to the comparative example.

Other Embodiments

A configuration has been described using a two-component developer containing toner and carrier as the developing apparatus 4 in the respective embodiments described above. However, the present invention is also applicable to a configuration using a one-component developer containing magnetic toner, as long as the magnetic pole S3 for separation described above is adopted. Further, the configurations of the above-described embodiments can be arbitrarily combined and implemented. For example, the configuration of the first embodiment can be combined with the configuration of the fourth embodiment.

Further, in addition to the configuration described above where developer is supplied to the developing sleeve 44 and developer is collected from the developing sleeve 44 in the developing chamber 41a, the present invention is applicable to a so-called function-separated developing apparatus where the functions of supplying developer and collecting developer are separated. For example, with reference to FIG. 3, the present invention is applicable to a configuration where developer is supplied from the developing chamber 41a to the developing sleeve 44, and developer removed from the developing sleeve 44 is collected in the agitating chamber 41b.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-068773, filed Mar. 30, 2017, which is hereby incorporated by reference wherein in its entirety.

What is claimed is:

1. A developing apparatus comprising:
   a developer bearing member configured to bear developer containing toner and carrier to develop an electrostatic latent image formed on an image bearing member;
   a first chamber configured to supply developer to the developer bearing member;
   a second chamber configured to communicate with the first chamber in such a manner that developer circulates between the first and second chambers;
   a partition wall configured to separate the first and second chambers;
   a first communicating portion configured to permit developer to communicate from the first chamber toward the second chamber;
   a second communicating portion configured to permit developer to communicate from the second chamber toward the first chamber;
   a first conveyance screw provided in the first chamber and configured to convey developer in the first chamber in a first direction from the second communicating portion toward the first communicating portion;

a second conveyance screw provided in the second chamber and configured to convey developer in the second chamber in a second direction from the first communicating portion toward the second communicating portion; and a replenishing portion provided upstream of a downstream end of the first communicating portion in the second direction and configured to replenish developer to the second chamber, wherein in a state that the developing apparatus is at a position to develop an electrostatic latent image formed on the image bearing member, an opening portion, through which an airflow from the second chamber toward the first chamber passes, is provided to the partition wall at a positon downstream of the first communicating portion and upstream of the second communicating portion in the second direction and above the top of the second conveyance screw in a vertical direction, a length of the opening portion being equal to or longer than a length of a plurality of pitches of blades of the second conveyance screw, and wherein a length, in the vertical direction, of the opening portion at a first position is longer than a length, in the vertical direction, of the opening portion at a second position, the first position being downstream of the second position and upstream of the second communicating portion in the second direction, the second position being downstream of the first communicating portion and upstream of the second communicating portion in the second direction.

2. The developing apparatus according to claim 1, wherein the opening portion is configured such that a length in the vertical direction of the opening portion is gradually increased from an upstream side toward a downstream side in the second direction of the opening portion.

3. The developing apparatus according to claim 1, wherein the opening portion is configured such that a length in the vertical direction of the opening portion is increased stepwisely from an upstream side toward a downstream side in the second direction of the opening portion.

4. The developing apparatus according to claim 1, wherein the opening portion is provided to the partition wall over an entire area between the first communicating portion and the second communicating portion in the second direction.

5. The developing apparatus according to claim 1, wherein a length in the vertical direction of the opening portion is a maximum of 5 mm.

* * * * *